(12) United States Patent
Osburn et al.

(10) Patent No.: US 9,784,166 B2
(45) Date of Patent: Oct. 10, 2017

(54) NOX SENSOR DIAGNOSTIC FOR AN EXHAUST AFTERTREATMENT SYSTEM

(71) Applicant: Cummins, Inc., Columbus, IN (US)

(72) Inventors: Andrew W. Osburn, Nashville, IN (US); Christopher Ferguson, Columbus, IN (US); Tony James Hall, Bemus Point, NY (US); Brian P. Liimatta, Columbus, IN (US)

(73) Assignee: Cummins Inc., Columbus, IN (US)

( * ) Notice: Subject to any disclaimer, the term of this patent is extended or adjusted under 35 U.S.C. 154(b) by 360 days.

(21) Appl. No.: 14/586,174

(22) Filed: Dec. 30, 2014

(65) Prior Publication Data

US 2016/0186630 A1 Jun. 30, 2016

(51) Int. Cl.
| F01N 3/00 | (2006.01) |
| F01N 3/10 | (2006.01) |
| F01N 11/00 | (2006.01) |
| F01N 3/20 | (2006.01) |

(52) U.S. Cl.
CPC ............ F01N 11/00 (2013.01); F01N 3/2066 (2013.01); *F01N 2550/02* (2013.01); *F01N 2560/026* (2013.01); *F01N 2560/14* (2013.01); *F01N 2900/1402* (2013.01); *Y02T 10/24* (2013.01); *Y02T 10/47* (2013.01)

(58) Field of Classification Search
CPC ................. F01N 11/00; F01N 2550/02; F01N 2560/026; F01N 2560/14; F01N 2900/1402; F01N 3/2066; Y02T 10/24; Y02T 10/47
USPC .......................................... 60/276, 277, 301
See application file for complete search history.

(56) References Cited

U.S. PATENT DOCUMENTS

| 7,921,706 | B2 * | 4/2011 | Sumitani | G01M 15/102 |
| | | | | 73/114.69 |
| 7,930,932 | B2 * | 4/2011 | Kariya | F02D 41/146 |
| | | | | 73/114.73 |
| 8,087,290 | B2 * | 1/2012 | Wickert | F02D 41/1445 |
| | | | | 73/114.69 |
| 8,219,278 | B2 * | 7/2012 | Sawada | B01D 53/9409 |
| | | | | 701/30.3 |
| 8,307,699 | B2 | 11/2012 | Sawada et al. | |
| 8,474,242 | B2 | 7/2013 | Andrews et al. | |

(Continued)

FOREIGN PATENT DOCUMENTS

WO   WO-2010/109946   9/2010

*Primary Examiner* — Phutthiwat Wongwian
*Assistant Examiner* — Diem Tran
(74) *Attorney, Agent, or Firm* — Foley & Lardner LLP

(57) ABSTRACT

A method for diagnosing NOx sensors in an exhaust aftertreatment system includes suspending reductant dosing in an exhaust aftertreatment system; purging a reductant deposit in a selective catalytic reduction (SCR) system of the exhaust aftertreatment system; adjusting at least one of an ignition timing and an engine speed for an engine to adjust an engine out nitrogen oxide (NOx) amount; receiving measured SCR inlet NOx data from a SCR inlet NOx sensor and measured SCR outlet NOx data from a SCR outlet NOx sensor; determining a phase shift between the measured SCR inlet and SCR outlet NOx data; applying the determined phase shift to the SCR outlet NOx data; and determining a diagnostic feature based on the SCR inlet NOx data and the phase shifted SCR outlet NOx data regarding a state of the SCR inlet and outlet NOx sensors.

15 Claims, 12 Drawing Sheets

(56) References Cited

U.S. PATENT DOCUMENTS

2004/0200271 A1* 10/2004 van Nieuwstadt . B01D 46/0036
73/114.78
2011/0252767 A1 10/2011 Lin et al.

* cited by examiner

NOX SENSOR DIAGNOSTIC FOR AN EXHAUST AFTERTREATMENT SYSTEM

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable. In fact, some regulations require on-board diagnostic (OBD) monitoring or testing of many of the components of the exhaust aftertreatment system. When equipped on vehicles, most monitoring and testing of aftertreatment system components are performed during on-road operation of the vehicle (e.g., while the vehicle is being driven on the road). Although such monitoring and testing may be convenient, the efficacy of the monitoring and testing may be limited because the engine cannot be operated outside of a given on-road calibrated operating range. Additionally, because on-road operating demands typically have priority over diagnostic and performance recovery procedures, the order, timing, and control of such procedures may be less than ideal. As a result, the detection and correction of various failure modes in the exhaust aftertreatment system may be limited.

SUMMARY

One embodiment relates to an apparatus including a dosing module, an engine module, a selective catalytic reduction (SCR) inlet NOx module, a SCR outlet NOx module, a phase correction module, and a system diagnostic module. The dosing module is structured to suspend dosing in an exhaust aftertreatment system. The engine module is structured to provide a command to an engine to affect an engine out nitrogen oxide (NOx) amount. The SCR inlet NOx module is structured to interpret measured SCR inlet NOx data from a SCR inlet NOx sensor. The SCR outlet NOx module is structured to interpret measured SCR outlet NOx data from a SCR outlet NOx sensor. The phase correction module is structured to determine a phase shift between the measured SCR inlet NOx data and the measured SCR outlet NOx data and apply the phase shift to the measured SCR outlet NOx amount data. The system diagnostic module is structured to determine a diagnostic feature based on the SCR inlet NOx data and the phase shifted SCR outlet NOx data, wherein the system diagnostic module is structured to determine a state of the SCR inlet and outlet NOx sensors based on the diagnostic feature, the state including at least one of an operational state and at least one of the SCR inlet and outlet NOx sensor are faulty. The apparatus provides a service technician the ability to diagnose exhaust aftertreatment problems to the SCR inlet and outlet NOx sensors, which thereby alleviates the need for costly and timely service diagnostics regarding the whole exhaust aftertreatment system.

Another embodiment relates to a method for diagnosing NOx sensors in an exhaust aftertreatment system. The method includes suspending reductant dosing in an exhaust aftertreatment system; purging a reductant deposit in a selective catalytic reduction (SCR) system of the exhaust aftertreatment system; adjusting at least one of an ignition timing and an engine speed for an engine to adjust an engine out nitrogen oxide (NOx) amount; interpreting measured SCR inlet NOx data from a SCR inlet NOx sensor and measured SCR outlet NOx data from a SCR outlet NOx sensor; determining a phase shift between the measured SCR inlet and SCR outlet NOx data; applying the determined phase shift to the SCR outlet NOx data; and determining a diagnostic feature based on the SCR inlet NOx data and the phase shifted SCR outlet NOx data regarding a state of the SCR inlet and outlet NOx sensors. According to one embodiment, the method is performed as an intrusive diagnostic tool for an engine and exhaust aftertreatment system, wherein the method controls operation of the engine and exhaust aftertreatment system.

Another embodiment relates to a system including an engine; an exhaust aftertreatment system in exhaust gas receiving communication with the engine, wherein the exhaust aftertreatment system includes a selective catalytic reduction (SCR) system; and a controller communicably coupled to the engine and the exhaust aftertreatment system. The controller is structured to suspend reductant dosing in the exhaust aftertreatment system; purge a reductant deposit in the SCR system; adjust a nitrogen oxide (NOx) amount out of the engine that is then received by the SCR system; interpret measured SCR inlet NOx data from a SCR inlet NOx sensor and measured SCR outlet NOx data from a SCR outlet NOx sensor; determine a phase shift between the measured SCR inlet and SCR outlet NOx data; apply the determined phase shift to the SCR outlet NOx data; and determine a diagnostic feature based on the SCR inlet NOx data and the phase shifted SCR outlet NOx data regarding a state of the SCR inlet and outlet NOx sensors. By utilizing measured SCR inlet and outlet NOx data, the controller is able to relatively more accurately diagnose the SCR inlet and outlet NOx sensors for the aftertreatment system.

These and other features, together with the organization and manner of operation thereof, will become apparent from the following detailed description when taken in conjunction with the accompanying drawings.

DETAILED DESCRIPTION

Figure 1:
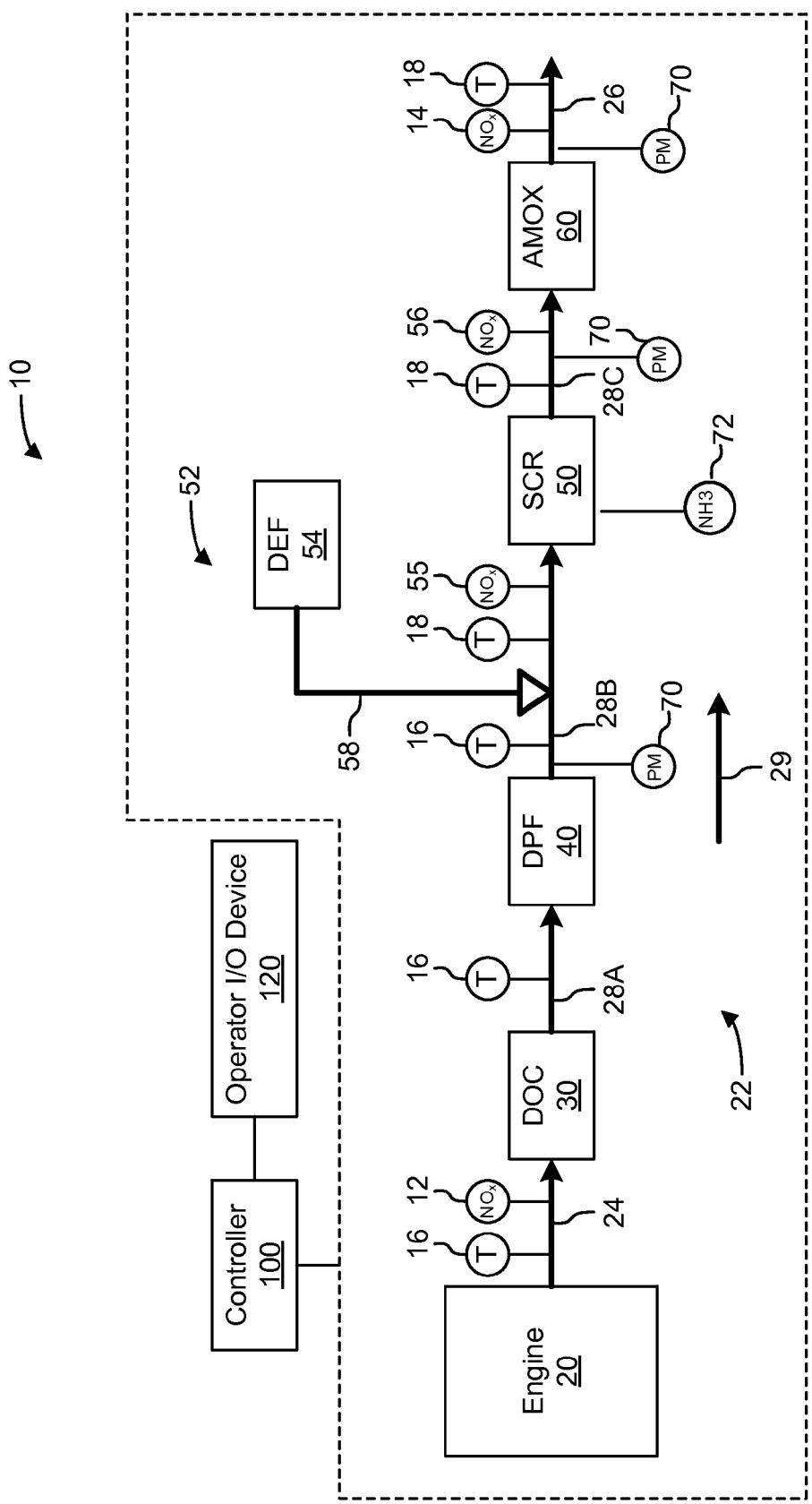
FIG. 1 is a schematic diagram of an exhaust aftertreatment system with a controller, according to an example embodiment.

Referring to the Figures generally, the various embodiments disclosed herein relate to a system and method of diagnosing NOx sensors in an exhaust aftertreatment system. According to the present disclosure, a controller performs an intrusive diagnostic procedure that manipulates a NOx amount out of an engine, measures the resulting NOx amount across a selective catalytic reduction (SCR) system, and determines whether (among other failure modes) the NOx inlet and NOx outlet sensor are faulty by utilizing one or more diagnostic features, which are described more fully herein. As a brief overview, some engine systems include exhaust aftertreatment systems for decreasing the pollutants emitted from the engine systems. Among other components, these exhaust aftertreatment systems may include a SCR system. The SCR includes a SCR catalyst that is designed to reduce the nitrous oxides (NOx) in engine exhaust gas to nitrogen and other less pollutant compounds. To accomplish this reduction, a reductant is sprayed into the exhaust gas stream prior to the exhaust gas reaching the SCR system. Over the SCR catalyst, the NOx reacts with ammonia that formed from the decomposition of the reductant, to form nitrogen and other less harmful compounds. In turn, a decrease in NOx emissions from the exhaust gas is accomplished. The efficiency of the SCR catalyst may be determined by measuring the reduction of NOx emissions from the exhaust gas between the inlet to the outlet of the SCR catalyst, which is described more fully below.

In certain embodiments, SCR efficiency may be determined by a NOx conversion fraction for the exhaust gas. The NOx conversion fraction may be determined from NOx data regarding the exhaust gas stream from the engine. For example, the NOx data may include an SCR inlet NOx amount (represented as NOx, inlet in equation [1] below). The NOx data may also include an SCR outlet NOx amount (represented as NOx, outlet in equation [1] below). Taking a difference between these two amounts, the NOx conversion fraction represents the percent reduction in NOx in the exhaust gas stream accomplished by the SCR system. According to one embodiment, the NOx conversion fraction amount may be determined as follows:

$$[(NOx, inlet - NOx, outlet)/NOx, inlet] \times 100 = NOx \text{ conversion fraction percent} \quad [1]$$

The NOx conversion fraction provides an indication of the efficacy of the SCR system. For example, a relatively higher conversion fraction indicates that a substantial amount of the NOx present in the exhaust stream is being reduced to nitrogen and other less pollutant compounds. However, a relatively lower conversion fraction indicates that the NOx in the exhaust gas stream is substantially not being converted to nitrogen and other less pollutant compounds.

In any event, the NOx conversion fraction may not be the only indicator of SCR efficiency. Low observed SCR efficiency may be caused by several components and interactions in the aftertreatment system. Component failures and interactions may make it difficult to correctly isolate the source of the malfunction. There are several scenarios where false faults (e.g., the SCR catalyst is functioning properly but a low SCR efficiency is observed) are possible (e.g., due to sensor failures, etc.). The numerous component failures which may cause a low SCR efficiency include, but are not limited to, the following failed components: the SCR inlet NOx sensor, the SCR outlet NOx sensor, the diesel exhaust fluid (DEF) dosing system, the diesel oxidation catalyst (DOC)/diesel particulate filter (DPF) unit, and the SCR/Ammonia oxidation (AMOx) catalyst unit.

According to the present disclosure, a controller isolates the low observed SCR efficiency to the SCR inlet and outlet NOx sensors if they are in fact faulty. Because these are typically the lowest cost items in the aftertreatment system, successful identification of them being faulty may save costs by removing the need to service/troubleshoot other aftertreatment components. However, the technician may still need to perform other troubleshooting if the controller determines that the NOx sensors are operational. With that in mind, according to the present disclosure, a controller provides one or more dosing commands to suspend the reductant dosing in the aftertreatment system. Following the dosing suspension, the residual reductant deposits within the SCR catalyst may be purged via thermal decomposition. By suspending dosing and purging the reductant, the NOx amount entering and leaving the SCR catalyst may remain relatively constant. The controller then provides one or more engine operation commands to adjust an engine out NOx amount. The NOx amount entering and leaving the SCR system is then measured by SCR inlet and outlet NOx sensors. The controller uses the measured SCR inlet and outlet NOx data to determine one or more diagnostic features (e.g., a gain associated with the data). Based on the one or more diagnostic features determined from the measured data, the state of the NOx sensors (e.g., faulty or operational) may be determined. Based on the state determined, the controller may provide one or more notifications (e.g., a fault code) to a user of the exhaust aftertreatment system indicating whether service, repair, maintenance, and the like of the NOx inlet and outlet sensor is needed. Accordingly, the system and method described herein enable the diagnosis of SCR NOx sensors by exciting the NOx signals from adjusting the engine out NOx amount and accounting for the dynamics between the inlet and outlet NOx sensor signals. Conventional diagnostic systems do not utilize and, therefore, do not appreciate the better diagnostic data received from exciting the NOx signals to diagnose NOx sensors as in the present disclosure. Exciting the NOx amount signals leads to richer NOx signals that yield a more accurate, more efficient diagnostic procedure. As such, the present disclosure provides for a technical improvement over conventional systems that results in a more accurate diagnostic procedure utilizing a more efficient use of resources (i.e., the system and method described herein tend to correctly identify whether the NOx sensors are faulty without the need for further troubleshooting thereby saving time and money). Further, by correctly identifying faults in the exhaust aftertreatment system that are caused by faulty SCR NOx sensors, timely and costly service trips may be avoided as the SCR NOx sensors are substantially less costly relative to other components.

As used herein, the term "intrusive" (in regard to performing one or more diagnostic tests) is used to refer to an active diagnostic test. In other words, the intrusive method, system, and apparatus describe a diagnostic test or protocol that is forced to run on the engine and exhaust aftertreatment system (i.e., causes the engine to operate at a certain speed, etc.). As a result, the active or intrusive diagnostic test is often run in a service bay or test center environment. In comparison, a passive diagnostic test may be performed while the engine and exhaust aftertreatment system are operational. For example, if embodied in a vehicle, the passive test may be performed while the operator is driving the vehicle. If an error is detected, a fault code or indicator lamp may be actuated to alert the operator of maintenance/service that may be required. According to the present disclosure, an intrusive method, system, and apparatus is utilized with the engine and exhaust aftertreatment system to manipulate or excite the NOx emissions in the exhaust gas stream from the engine system. In this regard, the "intrusive diagnostic test" of the present disclosure may include overriding various set engine operating points to perform the diagnostic test. For example, many engine operating points are set to be in compliance with one or more vehicular laws (e.g., emissions). By overriding one or more of these operating points, the engine may be forced into non-compliance with one or more vehicular laws. However, this intrusive test, procedure, and/or protocol allows for the effective diagnosis of a SCR inlet NOx sensor and a SCR outlet NOx sensor of the exhaust aftertreatment system to determine whether the sensors need to be repaired, replaced, or otherwise serviced.

Referring now to FIG. 1, an engine exhaust aftertreatment system with a controller is shown, according to an example embodiment. The engine system 10 includes an internal combustion engine 20 and an exhaust aftertreatment system 22 in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition) that utilizes any type of fuel (e.g., gasoline). Within the internal combustion engine 20, air from the atmosphere is combined with fuel, and combusted, to power the engine. Combustion of the fuel and air in the compression chambers of the engine 20 produces exhaust gas that is operatively vented to an exhaust manifold and to the exhaust aftertreatment system 22.

In the example depicted, the exhaust aftertreatment system 22 includes a diesel particular filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 22 are also possible The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In this manner, the level of $NO_2$ exiting the DOC 30 is equal to the $NO_2$ in the exhaust gas generated by the engine 20 plus the $NO_2$ converted from NO by the DOC.

In addition to treating the hydrocarbon and CO concentrations in the exhaust gas, the DOC 30 may also be used in the controlled regeneration of the DPF 40, SCR catalyst 50, and AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to reduce particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. Additionally, the DPF 40 may be configured to oxidize NO to form $NO_2$ independent of the DOC 30.

As discussed above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. As described herein, the controller 100 is structured to control the timing and amount of the reductant delivered to the exhaust gas. In some embodiments, the reductant may either be ammonia or DEF, which decomposes to produce ammonia. As briefly described above, the ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing. According to the present disclosure, the SCR catalyst and AMOx catalyst are positioned serially, with the SCR catalyst preceding the AMOx catalyst. As described above, in various other embodiments, the AMOx catalyst is not included in the exhaust aftertreatment system 22. In these embodiments, the NOx sensor 14 may be excluded from the exhaust aftertreatment system 22 as well.

Various sensors, such as $NH_3$ sensor 72, NOx sensors 12, 14, 55, 57 and temperature sensors 16, 18, may be strategically disposed throughout the exhaust aftertreatment system 22 and may be in communication with the controller 100 to monitor operating conditions of the engine system 10. As shown, more than one NOx sensor may be positioned upstream and downstream of the SCR catalyst 50. In this configuration, the NOx sensor 12 measures the engine out NOx while the NOx sensor 55 measures the SCR catalyst 50 inlet NOx amount, which is referred to as the SCR inlet NOx sensor 55 herein. Due to the DOC 30/DPF 40 potentially oxidizing some portion of the engine out NOx (e.g., NO, etc.), the proportions of engine out NOx amount (e.g., NO, $NO_2$, etc.) may not be equal to the proportions of SCR catalyst 50 inlet NOx amount. For example, while NO may be oxidized to $NO_2$ in the DOC 30/DPF 40 such that the relative proportions of NO, $NO_2$, etc. may not be equal to the original proportions from the engine, the total concentration of NOx remains the same. The NOx sensors 12, 14, 55, 57 tend to have a lower sensitivity to $NO_2$ which causes the sensed NOx amount to change with the ratio of $NO_2$/NOx. Accordingly, this configuration accounts for this potential discrepancy. The NOx amount leaving the SCR catalyst 50 may be measured by the NOx sensor 57 and/or the NOx sensor 14. In some embodiments, there may be only NOx sensor 57 or NOx sensor 14 depending on whether the configuration of the exhaust aftertreatment system 22 includes the AMOx catalyst 60. The NOx sensor 57 is positioned downstream of the SCR catalyst 50 and is structured to detect the concentration of NOx in the exhaust gas downstream of the SCR catalyst 50 (e.g., exiting the SCR catalyst), which is referred to as the SCR outlet NOx sensor 57 herein.

The temperature sensors 16 are associated with the DOC 30 and DPF 40, and thus can be defined as the DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. The temperature sensors 18 are associated with the SCR catalyst 50 and AMOx catalyst 60 and thus can be defined as SCR/AMOx temperature sensors 18. The SCR/AMOx temperature sensors 18 are strategically positioned to detect the temperature of exhaust gas flowing into the SCR catalyst 50, out of the SCR catalyst 50, into the AMOx catalyst 60, and out of the AMOx catalyst 60. By way of example, temperature sensors may be strategically positioned before and after any component within the exhaust aftertreatment system 22 such that the temperature of the exhaust gas flowing into and out of any component may be detected and communicably transmitted to the controller 100.

As shown in FIG. 1, a particulate matter (PM) sensor 70 is positioned downstream of the SCR 50. According to one embodiment, the PM sensor 70 is positioned in any position downstream of the DPF 40. Accordingly, other locations of the PM sensor 70 are also depicted in FIG. 1: after the DPF 40, after the AMOx catalyst 60, after the SCR catalyst 50, etc. In some embodiments, more than one PM sensor 70, as shown in FIG. 1, may also be included in the system. The PM sensor 70 is structured to monitor particulate matter flowing through the exhaust aftertreatment system 22. By monitoring the particulate matter, the PM sensor 70 monitors the functionality of the DPF 40 and/or other components of the exhaust aftertreatment system 22.

Although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system may include more than one of any of the various catalysts positioned in any of various positions relative to each other along the exhaust flow path as desired. Further, although the DOC 30 and AMOX catalyst 60 are non-selective catalysts, in some embodiments, the DOC and AMOX catalyst can be selective catalysts.

FIG. 1 is also shown to include an operator input/output (I/O) device 120. The operator I/O device 120 is communicably coupled to the controller 100, such that information may be exchanged between the controller 100 and the I/O device 120, wherein the information may relate to one or more components of FIG. 1 or determinations (described below) of the controller 100. The operator I/O device 120 enables an operator of the engine system 10 to communicate with the controller 100 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 100 and components described herein may be implemented with non-vehicular applications (e.g., a power generator). Accordingly, the I/O device may be specific to those applications. For example, in those instances, the I/O device may include a laptop computer, a tablet computer, a desktop computer, a phone, a watch, a personal digital assistant, etc. Via the I/O device 120, the controller 100 may provide a fault or service notification based on the determined state of the SCR catalysts 50 and the SCR inlet and outlet NOx sensors 55 and 57 (in some embodiments, when the AMOx catalyst is included, the NOx sensor 14).

The controller 100 is structured to control the operation of the engine system 10 and associated sub-systems, such as the internal combustion engine 20 and the exhaust gas aftertreatment system 22. According to one embodiment, the components of FIG. 1 are embodied in a vehicle. In various alternate embodiments, as described above, the controller 100 may be used with any engine-exhaust aftertreatment system. The vehicle may include an on-road or an off-road vehicle including, but not limited to, line-haul trucks, mid-range trucks (e.g., pick-up trucks), tanks, airplanes, and any other type of vehicle that utilizes an exhaust aftertreatment system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. For example, the data may include NOx data (e.g., an incoming NOx amount from SCR inlet NOx sensor 55 and an outgoing NOx amount from SCR outlet NOx sensor 57), dosing data (e.g., timing and amount of dosing delivered from doser 56), and vehicle operating data (e.g., engine speed, vehicle speed, engine temperature, etc.) received via one or more sensors. As another example, the data may include an input from operator input/output device 120. The structure and function of the controller 100 is further described in regard to FIG. 2.

Figure 2:
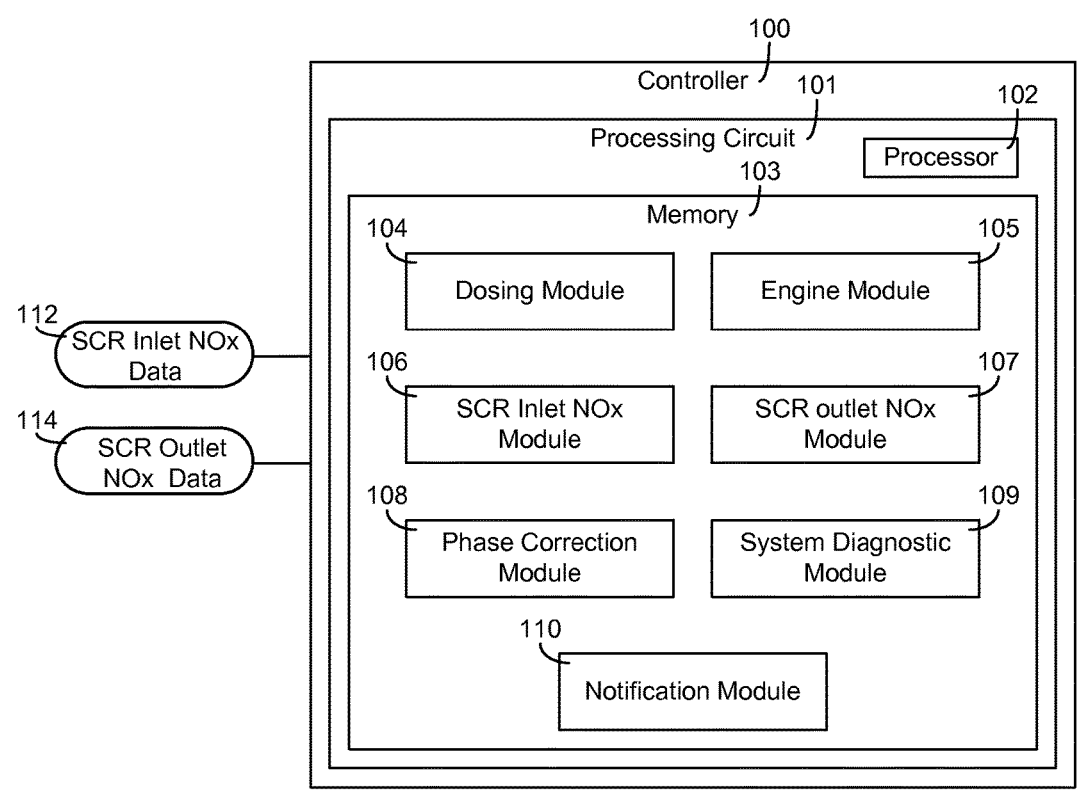
FIG. 2 is a schematic diagram of the controller used with the system of FIG. 1, according to an example embodiment.

As such, referring now to FIG. 2, an example structure for the controller 100 is shown according to one embodiment. As shown, the controller 100 includes a processing circuit 101 including a processor 102 and a memory 103. The processor 102 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 103 (e.g., RAM, ROM, Flash Memory, hard disk storage, etc.) may store data and/or computer code for facilitating the various processes described herein. Thus, the one or more memory devices 103 may be communicably connected to the processor 102 and provide computer code or instructions to the processor 102 for executing the processes described in regard to the controller 100 herein. Moreover, the one or more memory devices 103 may be or include tangible, non-transient volatile memory or non-volatile memory. Accordingly, the one or more memory devices 103 may include database components, object code components, script components, or any other type of information structure for supporting the various activities and information structures described herein.

The memory 103 is shown to include various modules for completing the activities described herein. More particularly, the memory 103 includes modules structured to diagnose the SCR inlet and outlet NOx sensors 55 and 57 (in some embodiments, the diagnosis may include NOx sensor 14). While various modules with particular functionality are shown in FIG. 2, it should be understood that the controller 100 and memory 103 may include any number of modules for completing the functions described herein. For example, the activities of multiple modules may be combined as a single module, additional modules with additional functionality may be included, etc. Further, it should be understood that the controller 100 may further control other vehicle activity beyond the scope of the present disclosure.

Certain operations of the controller 100 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 100 includes a dosing module 104, an engine module 105, a SCR inlet NOx module 106, a SCR outlet NOx module 107, a phase correction module 108, a system diagnostic module 109, and a notification module 110. The dosing module 104 is structured to provide a dosing command to a reductant doser, such as doser 56. The dosing command may include at least one of a command to suspend reductant dosing injection into the exhaust flow and a command to increase, decrease, or maintain a reductant dosing injection into the exhaust flow. Reductant dosing decreases the levels of NOx in the exhaust gas which causes the SCR outlet NOx sensor 57 to measure lower amounts of NOx than the SCR inlet NOx sensor 55. Therefore, by suspending the reductant dosing, the SCR NOx sensors should theoretically measure approximately the same levels of NOx in the exhaust flow if each sensor is functioning properly. However, there still may be trace amounts of reductant (e.g., ammonia) present in the SCR system that cause oxidation of the NOx in the exhaust gas flow such that the measurements from the SCR inlet and outlet sensors may not be exactly equal. As described more fully herein, to diagnose at least one of the SCR inlet NOx sensor and the SCR outlet NOx sensor, the dosing module 104 is structured to first suspend dosing.

The engine module 105 is structured to provide an engine operation command to the engine 20. The engine operation command is structured to purge the residual reductant in the SCR system 52. The engine operation command is also structured to adjust or perturb a NOx amount out of the engine. The engine operation command may include, but is not limited to, an ignition timing adjustment, an engine speed adjustment, an exhaust gas recirculation (EGR) flow amount adjustment, fuel injection timing adjustment, fuel injection pressure adjustment, a fuel injection amount adjustment, an air flow amount, a number of fuel injection pulses, a fuel flow amount, and an engine torque output, among other alternatives. The engine operation commands may be provided individually or with other commands. The extent to which any of the foregoing engine operation commands may be used and in what combination may vary based on engine design and/or engine application.

As mentioned above, the engine operation command may be structured to adjust or affect an engine out NOx amount. To adjust the engine out NOx amount, the engine module 105 may command an adjustment to at least one of the ignition timing, the engine speed, the EGR flow, the fuel injection timing, the fuel injection pressure, the number of fuel injection pulses, the fuel flow amount, and the engine torque amount. The ignition timing adjustment command may include at least one of an advance to ignition timing and a retarding to ignition timing. In a compression-ignition engine, ignition timing adjustment refers to when fuel is injected into a combustion chamber. In comparison, ignition timing adjustment in a spark-ignition engine refers to when a spark is commanded. Thus, when the controller 100 is embodied with a compression-ignition engine, the engine module 105 may provide a command to a fuel injector (including a solenoid or other fuel injector driver and the components related to the fuel injector, such as a common rail) to adjust when fuel is injected into the combustion chamber. When the controller 100 is embodied in a spark-ignition engine, the engine module 105 may provide a command to a spark plug or igniter (including any spark plug or igniter drivers, such as a solenoid or a transformer for a power supply) to adjust when the spark event is initiated. Accordingly, while the description below is substantially in regard to compression-ignition engines (e.g., fuel injectors), it should be understood that similar commands may be provided with spark-ignition commands such that all such variations fall within the spirit and scope of the present disclosure.

Therefore, as mentioned above, the engine module 105 may provide an ignition timing adjustment command that includes at least one of retarding and advancing ignition timing. The timing may be adjusted to increase or decrease the NOx production of the engine 20. Advancing the ignition timing refers to commanding fuel injection relatively earlier than it otherwise would occur. In comparison, retarding ignition timing refers to delaying a fuel injection event. For example, if the ignition timing of an engine is set to nine degrees before top dead center (BTDC) and is adjusted to twelve degrees BTDC, the ignition timing is advanced. Proper ignition timing may be critical for optimum performance, fuel economy, and emissions. Advancing ignition timing may result in increases to both the temperature and pressure within the engine cylinders. Because NOx formation tends to occur at relatively higher combustion temperatures, the NOx amount out of the engine may increase due to this command. In comparison, retarding ignition timing may result in lower temperature and pressures within the combustion cylinder. As a result, a relatively smaller amount of NOx out of the engine may occur. Thus, the engine module 105 may provide one or more commands to adjust the ignition timing, which results in a change in a NOx amount out of the engine and excites the measurements of the SCR inlet and outlet NOx sensors 55 and 57.

As mentioned above, the engine operation command from the engine module 105 may also include an adjustment to engine speed (i.e., revolutions-per-minute (RPM)). By increasing the engine speed, the average temperature of the engine cylinders may rise as heat is spread relatively more rapidly throughout the combustion chamber. Over time, the average temperature in the cylinder rises. This is due to the presence of relatively fewer lower temperature areas that would otherwise cause the temperature to descend. Therefore, because NOx production is highly dependent on high temperature, by increasing engine speed, the engine out NOx amount exhaust may increase. On the other hand, decreasing engine speed may have the opposite effect. This is due to a relatively greater number of low temperature areas in and around the combustion chamber that in essence 'cool' the combustion gases. As such, the temperature may decrease and in turn, the engine out amount of NOx may decrease. Increasing the engine speed demands a significant increase to the indicated torque and fuel flow to the engine 20, which may increase NOx production. Further, the increased flow through the engine provides a wider operating space to adjust the engine operation commands, allowing the possibility for finding a combination of engine operation commands that provides a higher NOx concentration than is possible at a lower speed.

The engine operation command from the engine module 105 may also include an adjustment to EGR flow. EGR is an emission control technology allowing substantial decreases in NOx emissions when the EGR flow is increased, and substantial increases when the EGR flow is decreased or stopped. Essentially, the amount of NOx decreases as the EGR rate increases. Also, NOx reduction at a given EGR rate increases as the engine load becomes higher. For example, a given decrease in NOx emissions may require less EGR at high loads (e.g., high engine torque, etc.) than at low loads (e.g., low engine torque, etc.). The engine operation command from the engine module 105 may adjust injection pressure. An increase in the fuel injection pressure may result in an increase in the NOx emissions at medium and at high engine loads (e.g., mid-to-high engine torque, etc.), while a decrease in the fuel injection pressure may decrease the NOx emissions. Multi-pulse injection may be used to lengthen the combustion event, thus increasing the amount of heat is the system, thereby facilitating the generation of greater amounts of NOx emissions. In some embodiments, engine brakes may be used to increase the load on the engine 20 or a variable geometry turbocharger (VGT) may also be used to increase load and flow by building exhaust backpressure. As described above, greater engine load may increase the NOx emissions. It should be noted that any of the foregoing engine operation commands may be used individually or in combination. As such, multiple engine commands may be used simultaneously to affect an increase or decrease in the NOx emissions of the engine 20.

Thus, the engine module 105 may provide one or more commands (e.g., advancing ignition timing and increasing engine speed, etc.) that are structured to excite (e.g., increase or decrease) an engine out NOx amount. While the embodiments described and disclosed herein are primarily in regard to increasing the engine out NOx amount to perform the diagnostic test, it should be understood that similar processes as those described herein may be utilized with commanded decreasing amounts of engine out NOx. All such variations are intended to be within the spirit and scope of the present disclosure.

Furthermore, as mentioned above, after the dosing module 104 suspends dosing, the engine module 105 is also structured to substantially purge the reductant deposits remaining in the SCR system 52. By removing (i.e., purging) the reductant from the system, the NOx in the exhaust gas flowing through the SCR system is substantially prevented from reducing via the reductant as the exhaust gas flows across the SCR catalyst 50. This may allow the SCR inlet and outlet NOx sensors 55 and 57 to substantially measure the same gas composition (i.e., NOx amount) during the diagnostic test. The purging of the reductant deposits may be done either mechanically or thermally. Thermal purging may be caused by an engine command from the engine module 105 that is structured to increase the temperature of the exhaust gas and burn off reductant deposits in the SCR system. As mentioned above, the engine module 105 may provide a command to at least one of increase engine speed and advance ignition timing. In other embodiments, the engine module 105 may use any command that raises the exhaust gas temperature to burn off or purge reductant deposits in the SCR system 52. For example, the engine module 105 may command a post-combustion fuel injection. The added fuel creates additional heat as it is transported with the exhaust gas to the DOC. As a result, the exhaust gas temperatures increase. By providing these commands, the temperature of exhaust gas within the exhaust aftertreatment system 22 may be substantially increased. With the increase in the temperature, the reductant may be thermally decomposed. Thus, the residual reductant deposits within the SCR system 52 may be substantially removed from the system allowing for the inlet SCR NOx amount and the outlet SCR NOx amount to be approximately the same. Mechanical purging may be from an operator or service technician physically removing the SCR system 52 and cleaning it (i.e., substantially removing any particulate matter and reductant deposits).

Figure 4:
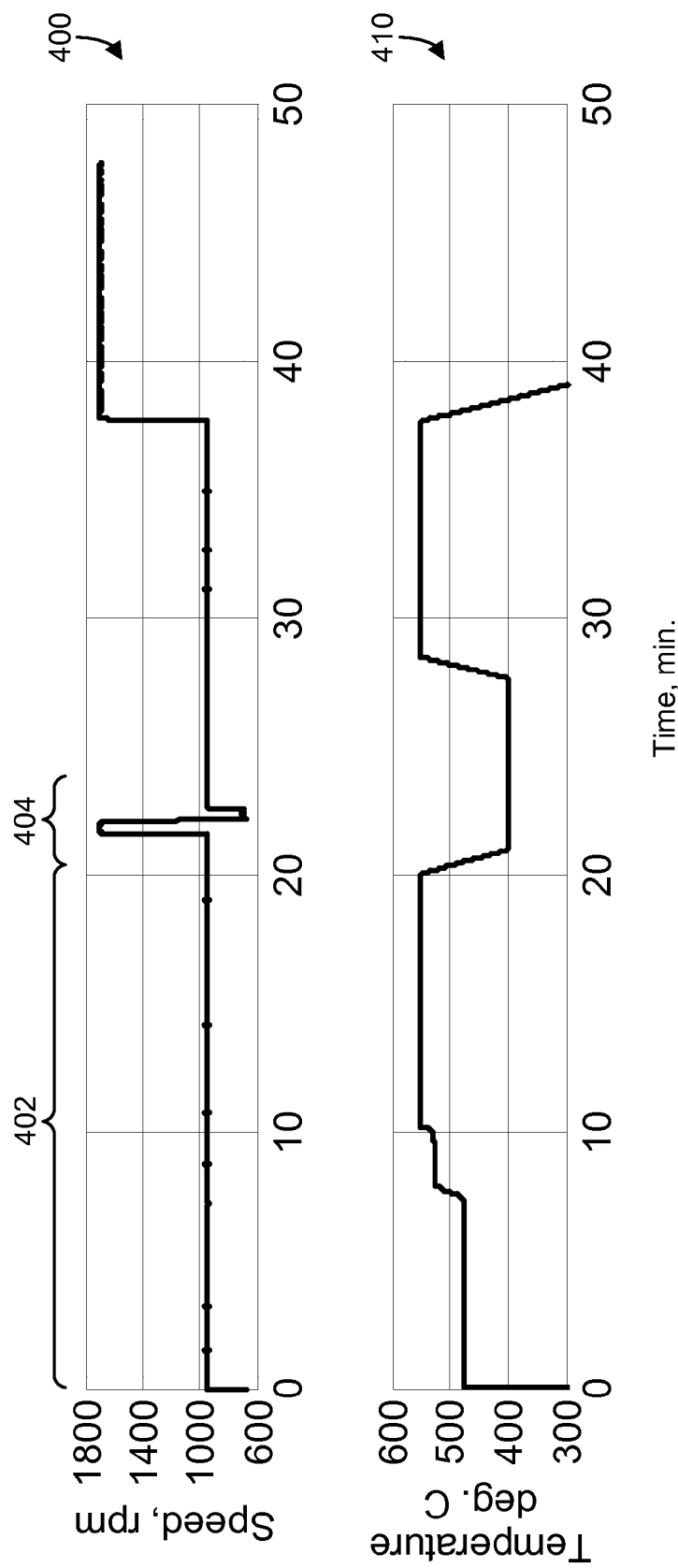
FIG. 4 are graphs corresponding to a selective catalytic reduction (SCR) system diagnostic test, according to an example embodiment.
Figure 5:
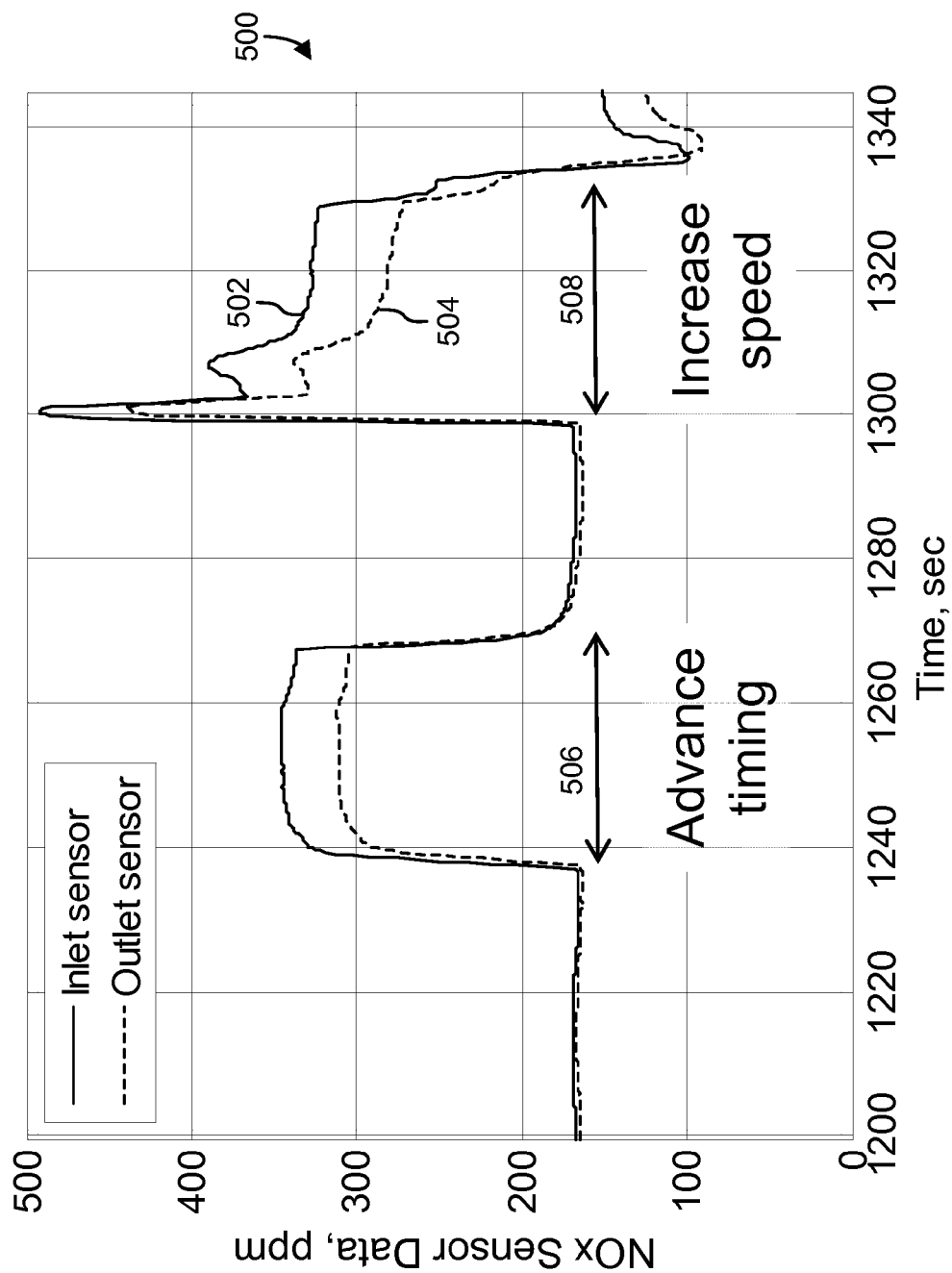
FIG. 5 is a graph depicting SCR NOx inlet and outlet data as a function of ignition timing and engine speed, according to an example embodiment.

To illustrate the functionality of the engine module 105, FIGS. 4-5 are now referenced. FIG. 4 depicts graphs of a selective catalytic reduction system service diagnostic test according to an example embodiment. A speed versus time graph 400 and a temperature versus time graph 410 of the SCR system diagnostic test are shown. The graph 400 depicts the engine speed of an engine from engine speed commands provided by the engine module 105. In the example diagnostic test of FIG. 4, a warm-up process 402 initiates the diagnostic process. During this process, the engine module 105 maintains a relatively high engine speed (e.g., 1000 RPM) for a relatively long period of time (e.g., approximately twenty minutes). As shown in graph 410, the warm-up process corresponds with an increase in exhaust temperature (e.g., greater than 500 degrees Celsius). In other embodiments, the purging process may take a longer (e.g., a 25 minute, etc.) or a shorter (e.g., a 15 minute, etc.) period of time to thermally purge the reductant deposits. Similarly, based on the engine used or other application, the engine speed may be greater than, less than, or equal to the example depicted in FIG. 4. In any event, the warm-up process 402 corresponds with the substantial removal of reductant deposits in the SCR system. During this warm-up or purging process 402, the dosing module 104 has suspended dosing.

At a predetermined time after the purging process, the engine module 105 further increases the speed of the engine (portion 404). The excitation portion 404 of graph 400 shows how the engine module 105 affects the engine out NOx amount via an increase in engine speed. A closer look into the effect of engine speed on NOx emissions may be seen in FIG. 5.

FIG. 5 depicts a graph 500 of SCR inlet NOx sensor data, such as SCR inlet NOx data 112, and SCR outlet NOx sensor data, such as SCR outlet NOx sensor data 114, as a function of ignition timing and engine speed. More particularly, FIG. 5 shows how the engine module 105 may affect the engine out NOx amount (and, consequently, the NOx amount measured by the SCR inlet NOx sensor 55 (curve 502) and the SCR outlet NOx sensor 57 (curve 504)) by commanding at least one of an adjustment to engine speed and ignition timing. In this example, the engine out NOx excitement begins after the purging process. In this example, the engine module 105 adjusts the engine out NOx amount after approximately twelve hundred seconds. In various other embodiments, as mentioned above, the purging process may be shorter or longer, such that the engine out NOx adjustment occurs at a different point in time. Thus, in the example shown, after a predetermined amount of time (e.g., 1240 seconds) the engine module 105 advances the ignition timing (portion 506). Following this first NOx excitation command, the engine module 105 increases the engine speed (portion 508). In other embodiments, the excitations of the engine out NOx amount may be induced/caused by any of the above mentioned commands provided by the engine module 105 (e.g., advancing/retarding ignition timing, increasing/decreasing engine speed, post-combustion fuel injections, etc.). Also, the order, timing, and duration of the engine out NOx commands may change. For example, the engine speed may be increased followed by the advance of ignition timing or the ignition timing and engine speed may be increased and advanced simultaneously. Also, the NOx excitation process may include any number of engine out NOx excitation events (e.g., one, two, three, five, eight, etc.).

In this example, the first NOx excitation 506 is caused by an advanced ignition timing command. The advanced ignition timing causes the NOx levels in the exhaust to increase from 170 parts-per-million (ppm) to over 300 ppm, as is shown in the graph 500. In other embodiments, the excitation may be caused by retarding the ignition timing command. Retarding the ignition timing command may cause the NOx levels in the exhaust to decrease. As shown, a second excitation 508 at approximately 1300 seconds is caused by an increase engine speed command corresponding with the excitation portion 404 (FIG. 4). The increase in engine speed causes the NOx levels in the exhaust to increase from 170 ppm to 500 ppm. In other embodiments, the excitation may be caused by a reduction in engine speed which may cause the NOx levels in the exhaust to decrease. In other embodiments, the rates at which the NOx levels increase (or decrease) and by how much may vary (e.g., the NOx levels may rise from 170 ppm to 250 ppm in 8 seconds, etc.). One purpose of the excitation is to quantify how the sensors react to the rapidly changing NOx levels to determine if they are effective in monitoring NOx in the exhaust flow. In other words, the engine 20 is manipulated to provide a richer NOx signal which contains more useful diagnostic information.

Referring back to FIG. 2, it should be understood that other parameters may also be controlled by the engine module 105. Generally speaking, however, the engine module 105 is structured to adjust one or more parameters that affect a NOx amount emitted from the engine, as well as purge any residual reductant within the SCR system 52. Accordingly, although engine speed and engine timing are described as independent events, these events may be collectively commanded. Similarly, additional actuation commands may also be provided by the engine module 105 that alter/change the NOx emission levels out of the engine and that substantially purge the reductant deposits in the SCR system 52.

The SCR inlet NOx module 106 is structured to receive and store the SCR inlet NOx data 112 entering the SCR system (e.g., SCR system 52). Thus, the SCR inlet NOx module 106 may be communicably coupled to the SCR inlet NOx sensor 55. The SCR outlet NOx module 107 is structured to receive and store the SCR outlet NOx data 114 exiting the SCR system. Thus, the SCR outlet module 107 may be communicably coupled to the SCR outlet NOx sensor 57. The rate at which the NOx data (e.g., the SCR inlet NOx data 112, the SCR outlet NOx data 114, etc.) may be measured and stored within each of the modules 106 and 107 may be dependent on the sampling rate of the respective NOx sensors being used in the exhaust aftertreatment system 22. In one embodiment, the NOx data may be acquired at a rate substantially close to the maximum sampling rate of the sensors. In other embodiments, the NOx data may be measured periodically (e.g., every 5 seconds, etc.). The sampling rate may be predefined within the controller 100 or a user may define the sampling rate via the operator I/O device 120. The NOx data acquired and stored by both modules 106 and 107 may be provided to the phase correction module 108 and the system diagnostic module 109 to diagnose one or more components of the exhaust aftertreatment system 22, which is described more fully herein.

In other embodiments, an additional controller module may be included such as an AMOx outlet NOx module. The modules 106, 107, and the AMOx outlet NOx module are structured to receive measured NOx data. The NOx data includes at least one of a SCR inlet NOx amount, a SCR outlet NOx amount, and an AMOx outlet NOx amount. Accordingly, the NOx data may be measured in real time or substantially real time by NOx sensors 55, 57, and 14. The measured NOx data provides an indication of the NOx amount in the exhaust gas stream entering and leaving the SCR system 52 (in some embodiments, the AMOx 60).

The phase correction module 108 is structured to receive the SCR inlet NOx data 112 and the SCR outlet NOx data 114 from modules 106 and 107. The phase correction module 108 is also structured to determine a phase shift between the measured SCR inlet and outlet NOx data 112 and 114. The phase shift may be described as follows. The timing in which the SCR inlet and outlet NOx sensors 55 and 57 measure NOx levels is subject to a transport delay due to the exhaust flowing from the SCR inlet NOx sensor 55 to the SCR outlet NOx sensor 57. Transport delay refers to the time or duration in which it takes an amount of the exhaust gas to travel from the SCR inlet NOx sensor 55 to the SCR outlet NOx sensor 57. For example, it may take the exhaust gas X seconds to travel through the SCR system 52. Therefore, the SCR outlet NOx data 114 (e.g., NOx amounts, etc.) measured by the outlet sensor may be shifted by X seconds when compared to the SCR inlet NOx data 112. The transport delay may also be a function of the response time of the sensors used in the exhaust aftertreatment system 22. According to one embodiment, the transport delay between the SCR inlet NOx data 112 and the SCR outlet NOx data 114 may be determined by using a cross-correlation function which is described more fully herein. However, in certain other embodiments, other functions may be utilized to determine the transport delay.

Figure 6:
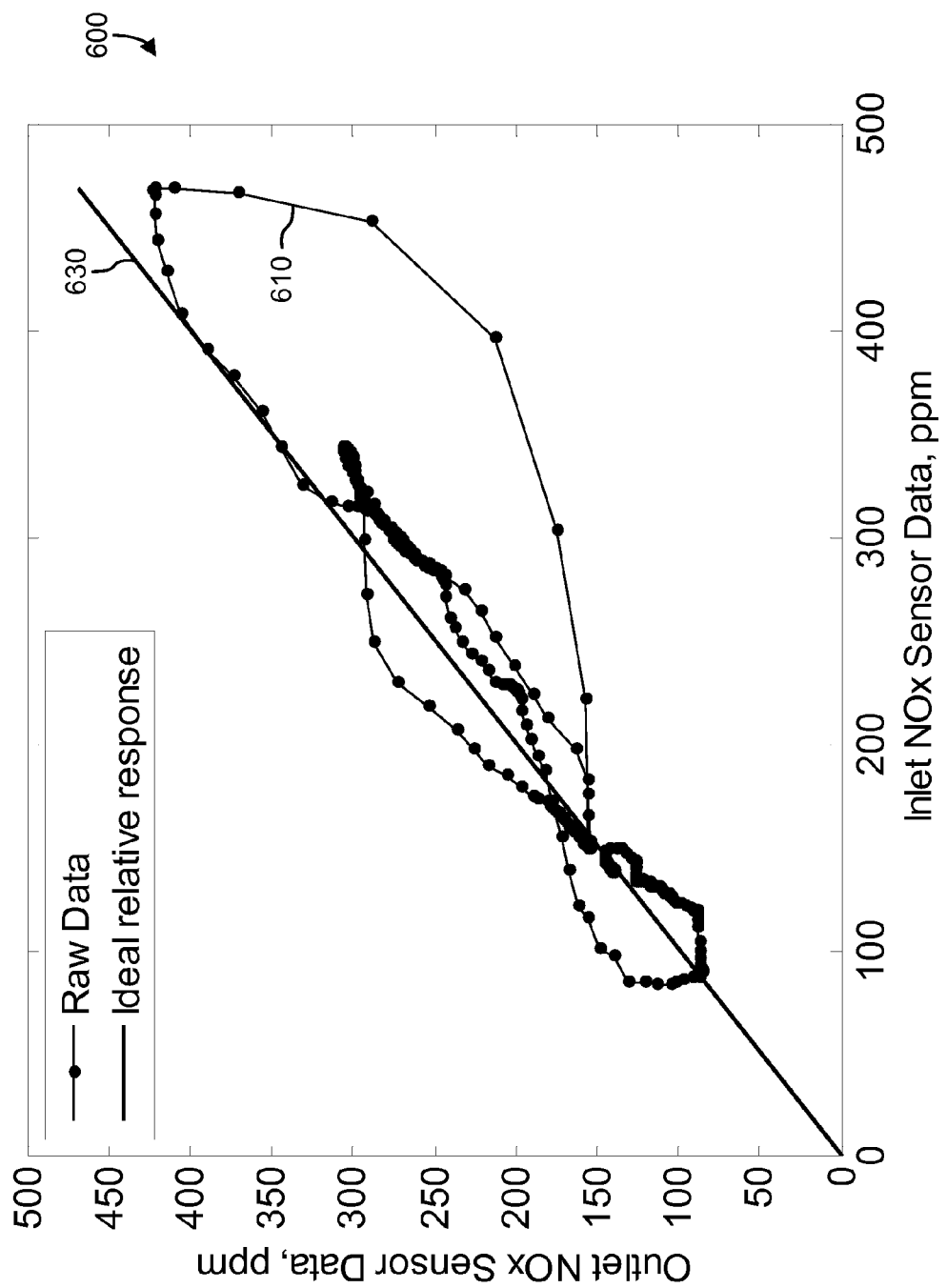
FIG. 6 is a graph of outlet NOx sensor data versus inlet NOx sensor data showing the effect of transport delay, according to an example embodiment.
Figure 7:
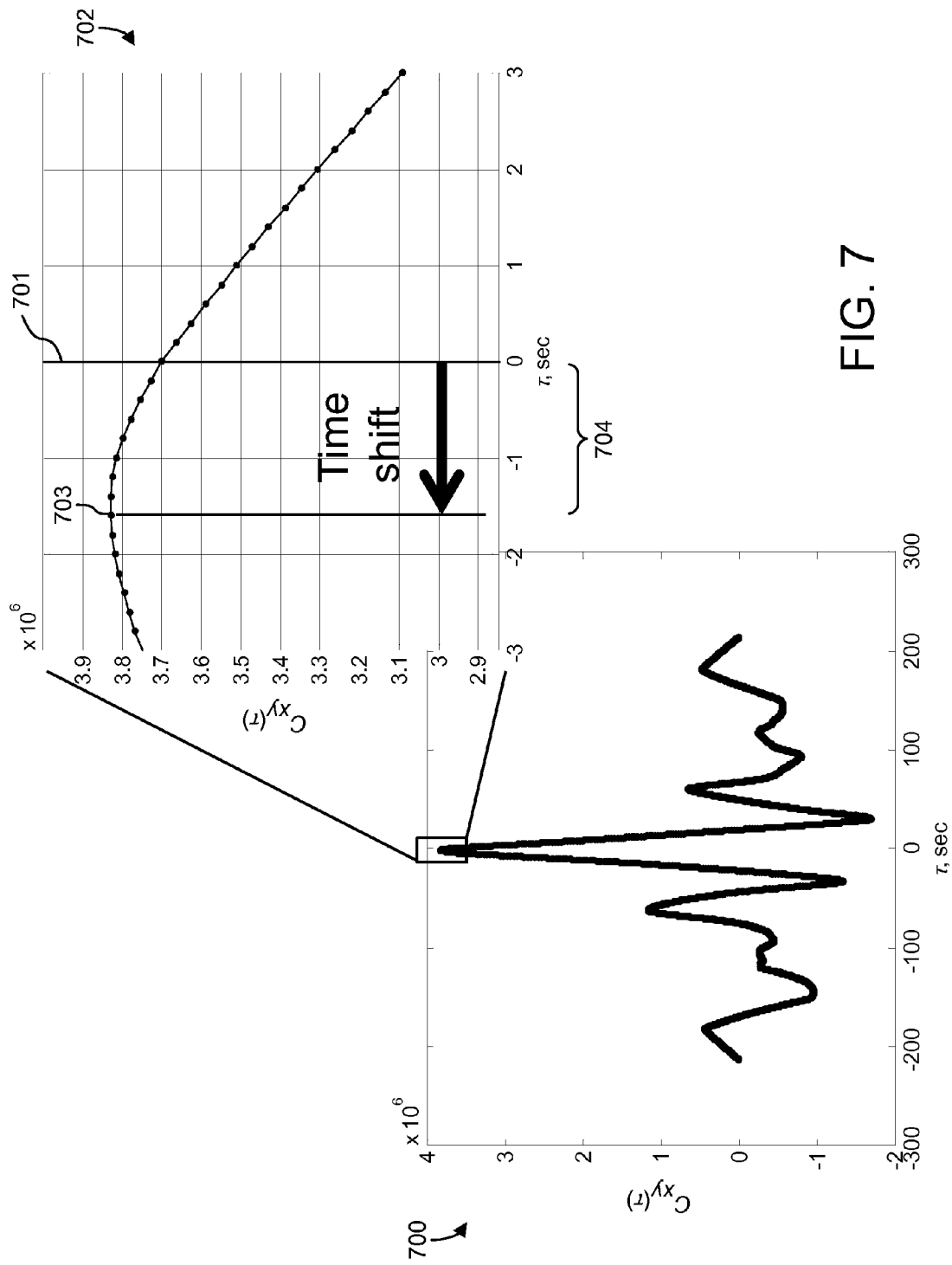
FIG. 7 is a graph of a cross-correlation function of outlet NOx sensor data and inlet NOx sensor data, according to an example embodiment.

To aid explanation of transport delay, referring now to FIGS. 6-7, FIG. 6 depicts a comparison of the SCR inlet and the outlet NOx data (e.g., the SCR inlet NOx data 112 and the SCR outlet NOx data 114, etc.) with the effects of transport delay according to one embodiment. Transport delay may be referred to herein as phase lag or phase shift. Additionally, transport delay may be referred to in the time domain as time lag or time shift. Still referring to FIG. 6, a graph 600 shows a scatter of diagnostic data 610 around an ideal response 630. The diagnostic data 610 refers to the SCR inlet and outlet NOx data measured and accumulated by the modules 106 and 107. The ideal response 630 is defined as ideal because it represents diagnostic data in which the SCR inlet NOx sensor 55 and the SCR outlet NOx sensor 57 measure identical NOx data. For example, in an ideal test, all of the reductant deposits are purged from the SCR system 52. This causes the SCR inlet NOx to be identical to the SCR outlet NOx. Also, in an ideal response, a phase lag between the sensors is not present. Accordingly, the ideal response 630 corresponds with a line representing SCR NOx outlet data versus SCR NOx inlet data having a slope of one. Comparatively, the scatter of the diagnostic data 610 around the ideal response 630 is caused by the phase lag of the downstream sensor (the SCR outlet NOx sensor 57) relative to the SCR inlet NOx sensor. Due to the diagnostic data 610 substantially not following the ideal response 630, the phase correction module 108 determines that the inlet and outlet NOx data are out-of-phase and a phase shift is determined by the phase correction module 108.

The phase (or time) shift refers to the transport delay duration (i.e., the duration it takes an amount of exhaust gas to travel from the SCR inlet NOx sensor to the SCR outlet NOx sensor). FIG. 7 depicts a graph of a cross-correlation function of the SCR inlet NOx data and the SCR outlet NOx data (e.g., the SCR inlet NOx data 112 and the SCR outlet NOx data 114, etc.) used to determine a time shift between the SCR inlet and outlet NOx measurements according to one embodiment. More particularly, FIG. 7 shows how the phase correction module 108 may determine the phase shift between the SCR inlet and outlet NOx measurements. The dynamics of the NOx sensors are substantially impacted by the transport delay. The phase correction module 108 may utilize various numerical methods (e.g., a cross-correlation function, etc.) or any other processes or methods to determine the phase shift of the SCR outlet NOx data relative to the SCR inlet NOx data (e.g., diagnostic data 610) brought upon by the transport delay. In this example, a cross-correlation function may be utilized by the phase correction module 108 to determine the transport delay (i.e., time lag, phase shift, etc.) between the measurements of exhaust flow characteristics (e.g., NOx emissions) along the exhaust aftertreatment system 22. After applying a cross-correlation function between the two signals, the phase correction module 108 may determine a maximum of the cross-correlation function. The maximum indicates the point in time where the signals (the SCR inlet NOx measurement signal and the SCR outlet NOx measurement signal) are best aligned. In this example, a graph 700 shows a cross-correlation analysis between the SCR inlet NOx data and the SCR outlet NOx data presented in FIG. 6. By implementing a cross-correlation function, the transport delay between the two sets of data may be determined from the cross-correlation maximum 703. Looking at an enlarged view 702 of the cross-correlation maximum 703, a time shift 704 may be quantified by determining the horizontal shift of the cross-correlation maximum 703 from a vertical axis 701. The time shift 704 represents the transport delay between the measurements provided by the SCR inlet and outlet NOx sensors. In the example, the phase shift 704 between the SCR inlet and outlet NOx data is approximately 1.6 seconds. In other embodiments, the time lag between the two sensors may be shorter or longer depending on the relative response time of the sensors and the dimensions of the SCR system 52 (i.e., the distance between the SCR inlet and outlet NOx sensors 55 and 57).

Based on the determined time shift, the phase correction module 108 is structured to apply the time or phase shift to the SCR outlet NOx data 114. In one embodiment, the application of the phase shift by the phase correction module 108 is performed by shifting the SCR outlet NOx data 114 by the determined phase shift. In this example, with the determined phase shift from FIG. 7 of 1.6 seconds, the diagnostic data 610 (specifically, the SCR outlet NOx data) may be shifted by that amount. Therefore, the data accumulated prior to 1.6 seconds by the SCR outlet NOx sensor 57 may be removed and the remaining data may be shifted accordingly (e.g., the data point previously at 1.6 seconds may now be the data point at zero seconds, etc.). Also, an equivalent number of data points may be removed from the last measurements made by the SCR inlet NOx sensor 55. This phase shift correction allows for the gas composition at each time interval to be substantially equivalent for both the inlet and outlet NOx sensors. This results in the transport delay between the inlet and outlet NOx sensors being substantially minimized, causing the transport delay to have minimal effect on the NOx sensor diagnostic test of the present disclosure.

To summarize, as the diagnostic test on the SCR inlet and outlet NOx sensors 55 and 57 is performed, the sensors may be measuring data simultaneously. However, the data being measured by each sensor may be of differing gas compositions due to the transport delay. For example, at time X, the SCR inlet sensor 55 may measure a certain amount of NOx in the exhaust gas. The amount or sample of exhaust gas at the inlet may be different from the amount or sample of exhaust measured by the SCR outlet sensor 57 at time X due to the transport delay. Therefore, the SCR outlet NOx data 114 measured by the outlet sensor may be corrected by the determined time shift (from the transport delay effects) so that the data at time X corresponds to the substantially same gas composition or sample at both sensors, which may allow for a substantially improved diagnostic analysis.

After application of the determined phase shift by the phase correction module 108 on the SCR outlet NOx data 114, the system diagnostic module 109 is structured to determine a diagnostic feature based on the SCR inlet NOx data 112 and the phase shifted SCR outlet NOx data 114. The system diagnostic module 109 is structured to determine a state of the SCR inlet and outlet NOx sensors based on the diagnostic feature, wherein the state includes at least one of both of the SCR inlet and outlet NOx sensors are operational and at least one of the SCR inlet and outlet NOx sensors are faulty. This determination, detailed descriptions of faulty states, and other features are explained more fully herein.

The diagnostic feature may include at least one of a first diagnostic feature and a second diagnostic feature. The first diagnostic feature may include a gain diagnostic feature. The second diagnostic feature may include a correlation coefficient diagnostic feature. The gain diagnostic feature refers to how close the inlet and outlet NOx sensor measurements are to one another. In one embodiment, the gain diagnostic feature may be determined by plotting the phase shifted SCR outlet NOx data 114 versus SCR inlet NOx data 112 and performing a least-squares linear regression of the plotted data while setting the y-intercept to zero. The slope of the resulting line represents the gain diagnostic feature. If the SCR inlet and outlet NOx data 112,114 are identical (i.e., an ideal case) or substantially identical, the gain (or slope) is one or may approach one. However, if the SCR outlet NOx data 114 are a factor of X (e.g., 3) less than the SCR inlet NOx data 112, the gain of the line is 1/X (e.g., ⅓). In other embodiments, the gain diagnostic feature may be determined using any other statistical methods which may determine the slope of data (e.g., inlet and phase shifted outlet NOx data).

The correlation coefficient diagnostic feature refers to the degree to which a linear relationship exists between the measured SCR inlet NOx data 112 and the phase shifted SCR outlet NOx data 114. For example, a substantially linear relationship may result in a correlation coefficient of 0.99 or higher. According to one embodiment, the correlation coefficient diagnostic feature may be determined as follows:

$$r = \frac{n\sum xy - (\sum x)(\sum y)}{\sqrt{n(\sum x^2) - (\sum x)^2} \sqrt{n(\sum y^2) - (\sum y)^2}} \quad [2]$$

where r is the correlation coefficient diagnostic feature, x is the SCR inlet NOx data 112 measured by the SCR inlet NOx sensor 55, y is the SCR outlet NOx data 114 measured by the SCR outlet NOx sensor 57, and n is the number of data pairs measured by the inlet and outlet NOx sensors. A positive correlation infers that the change in one variable may predict a change in the same direction in the second variable. For example, as engine out NOx amount increases from an increase in engine speed or an advance in ignition timing, both the inlet and outlet NOx sensors may also measure a relative increase. A negative correlation infers that a change in one variable means a change in the second variable in the other direction. A correlation coefficient of zero indicates that there is no discernable relationship between the SCR inlet and phase shifted outlet NOx data 112,114. For example, as engine out NOx amounts fluctuate, one sensor may measure the relative changes while the other sensor measures constant NOx levels (e.g., a stuck in-range error). Due to the faulty sensor, a substantially non-linear relationship between the inlet and outlet NOx measurements may be present, causing the correlation coefficient between the two data sets to be substantially zero or less than zero (i.e., negative).

Figure 8:
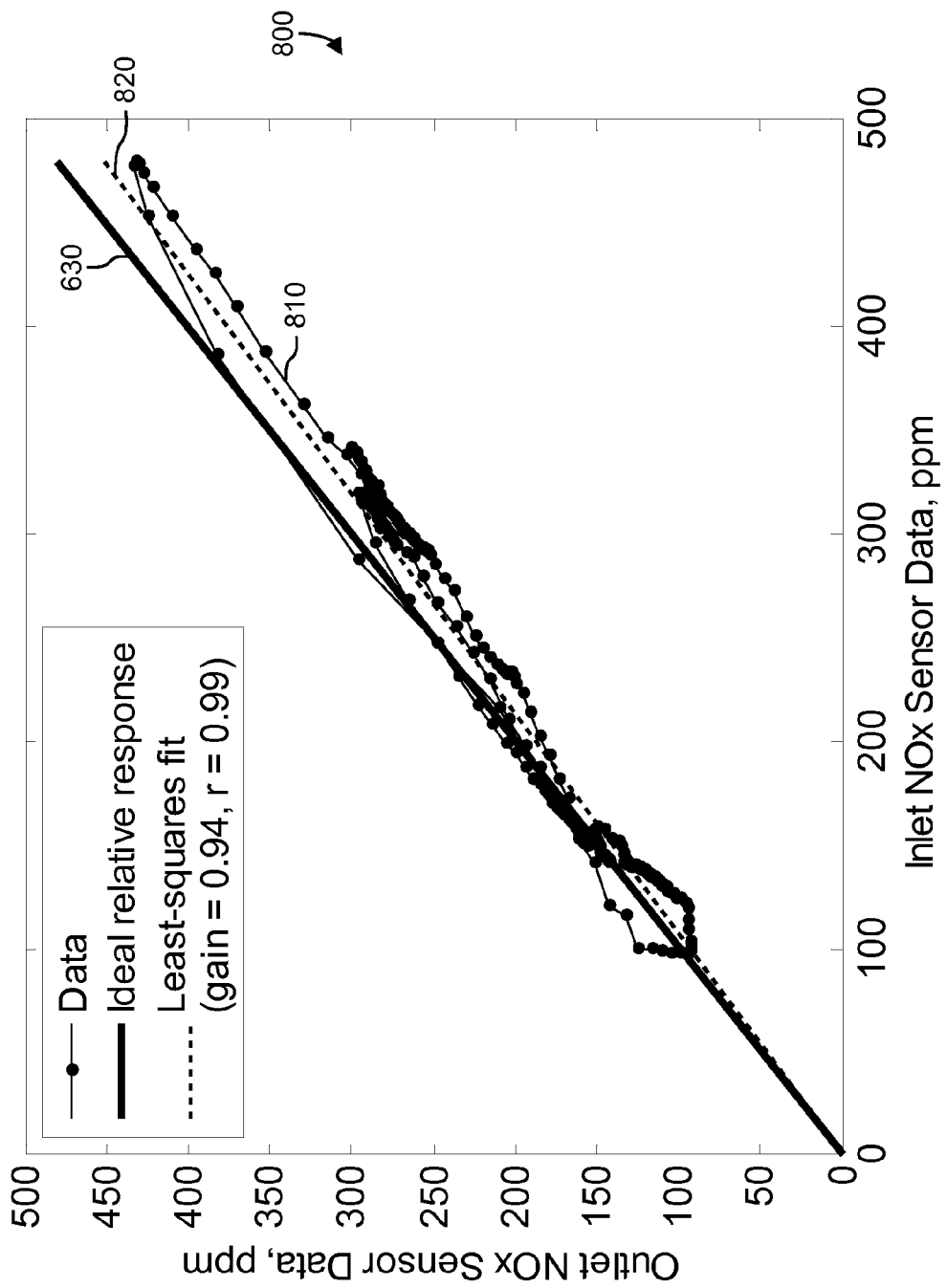
FIG. 8 is a graph of outlet NOx sensor data versus inlet NOx sensor data with a time shift correction, according to an example embodiment.

To illustrate how the system diagnostic module 109 may determine the gain and correlation coefficient diagnostic features, FIG. 8 is now referenced. FIG. 8 depicts SCR inlet versus outlet NOx data (e.g., the SCR inlet NOx data 112 and the SCR outlet NOx data 114, etc.) with an applied phase shift correction according to one embodiment. As shown, the diagnostic data 810 (i.e., phase shift corrected diagnostic data 610) is relatively more linear than the diagnostic data 610, which is due to the implementation of the phase shift. As mentioned above, from the system diagnostic module 109 applying a least-squares linear regression with a y-intercept of zero and equation [2], the gain and correlation coefficient may be determined. From performing the regression, a least-squares linear regression line 820 is fit to the diagnostic data 810. In turn, in this example, the gain and correlation coefficient are determined by the system diagnostic module 109 to be 0.94 and 0.99. Therefore, as described more fully herein, the system diagnostic module 109 determines a state of the SCR inlet and outlet NOx sensor based on the diagnostic features. In this example, the module 109 determines the sensors to be functioning properly (i.e., operational) and are likely not the cause of a potential low observed efficiency of the SCR catalyst 50.

As mentioned above, based on at least one of the first and second diagnostic feature determined by the system diagnostic module 109, the system diagnostic module 109 is structured to determine the state of the sensors: operational, inconclusive results, or faulty. An operational state corresponds with the NOx sensors functioning properly. According to one embodiment, the system diagnostic module 109 is structured to determine that the SCR inlet and outlet NOx sensors are operational based on the correlation coefficient diagnostic feature being greater than or equal to an operational correlation coefficient diagnostic feature threshold and the gain diagnostic feature being within a set of operational gain diagnostic feature parameters. In one embodiment, this determination corresponds with the gain being greater than or equal to 0.90 but less than or equal to 1.10 (i.e., the set of operational gain diagnostic feature parameters) and the correlation coefficient being greater than or equal to 0.98 (i.e., the operational correlation coefficient diagnostic feature threshold). Therefore, in a scenario with properly functioning SCR NOx sensors, there may be a highly linear relationship between the two data sets and a substantially ideal response (i.e., both sensors reading substantially equal values) as shown in FIG. 8.

The system diagnostic module 109 may also determine that the results are inconclusive. Inconclusive results may correspond with reductant deposits being detected. When reductant deposits are detected, the gain diagnostic feature indicates that a substantially non-ideal relationship (i.e., slope) exists between the SCR inlet and the phase shifted SCR outlet NOx data 112,114 with a non-linear relationship also existing based on the determined correlation coefficient diagnostic feature. According to one embodiment, the diagnostic module 109 determines that the results are inconclusive based on the correlation coefficient diagnostic feature being within a set of inconclusive correlation coefficient diagnostic feature parameters and the gain diagnostic feature being less than an inconclusive gain diagnostic feature parameter. In one embodiment, this situation corresponds with the gain diagnostic feature being less than 0.90 (i.e., the inconclusive gain diagnostic feature parameter) and the correlation coefficient being less than 0.98 but greater than zero (i.e., the set of inconclusive correlation coefficient diagnostic feature parameters). According to other embodiments, the gain and correlation diagnostic feature values that indicate an inconclusive state may differ from that mentioned above. For example, the gain may be substantially lower than one due to the presence of reductant in the SCR catalyst 50 reacting with the NOx in the exhaust gas, reducing the NOx to less harmful emissions. This reduction may cause the inlet NOx amount to be substantially more than the outlet NOx amount, which may cause the gain diagnostic feature to be substantially less than one. Also, the relatively poor correlation coefficient may be caused by the reductant deposits being present and continually being purged (i.e., thermally decomposed) throughout the NOx excitation process (see, e.g., FIG. 12). Thus, the SCR outlet NOx sensor 57 may continually measure the amount of NOx throughout the diagnostic process in a non-linear fashion (e.g., exponentially, etc.), resulting in a non-linear relationship between the SCR inlet and the outlet NOx data 112,114.

Figure 12:
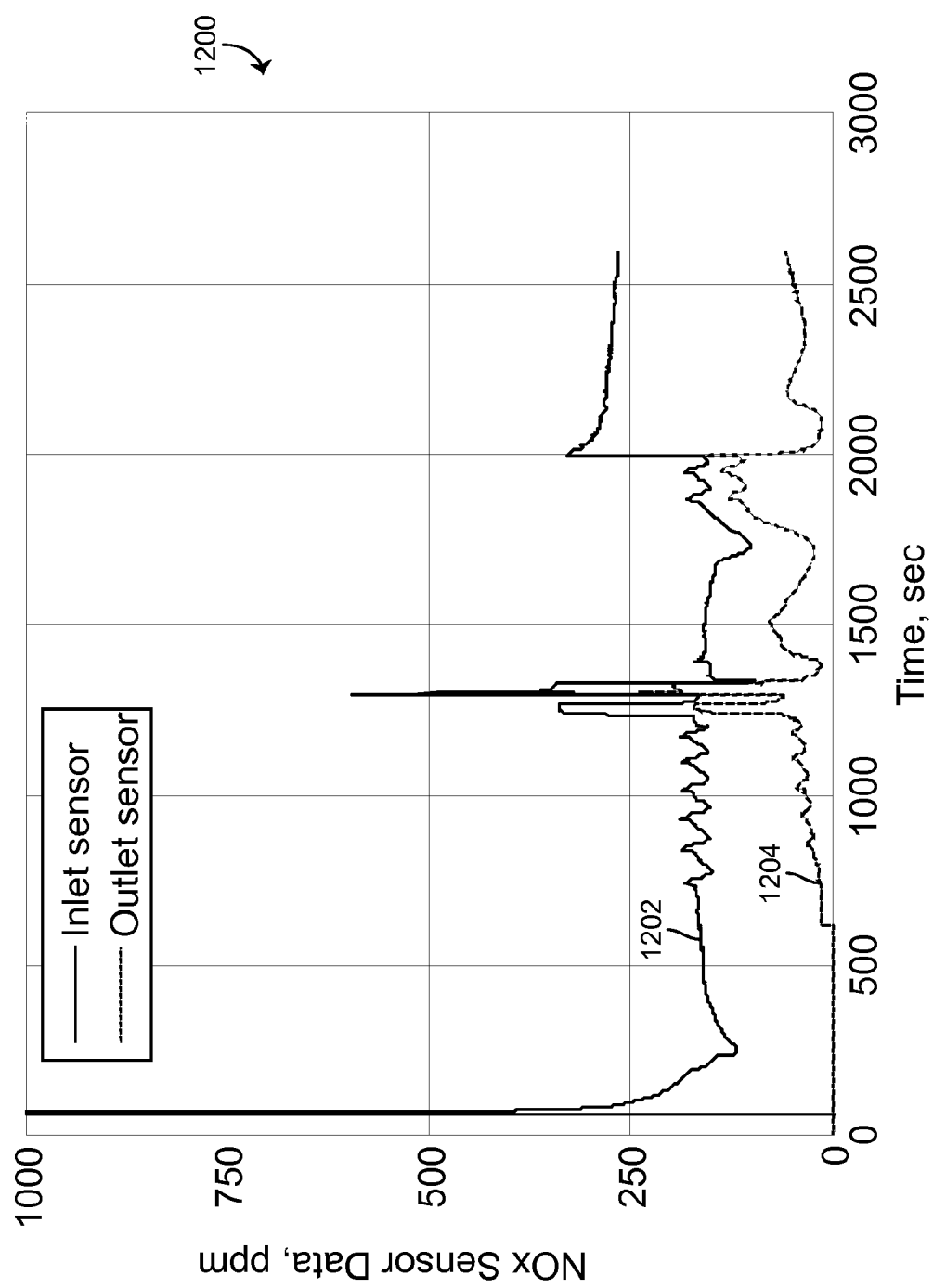
FIG. 12 is a graph of a NOx conversion fraction between outlet NOx sensor data and inlet NOx sensor data with reductant deposits present in the aftertreatment system, according to an example embodiment.

To demonstrate the non-linearity between inlet and outlet NOx measurements when reductant deposits are present, FIG. 12 is now referenced. FIG. 12 depicts a graph 1200 of changing NOx conversion between inlet NOx sensor data and outlet NOx sensor data (e.g., the SCR inlet NOx data 112 and the SCR outlet NOx data 114, etc.) according to one embodiment. An outlet NOx sensor data curve 1204 continually approaches an inlet NOx sensor data curve 1202 as time progresses during the diagnostic test. For example, at time 1000 seconds, the difference in magnitude of the curves 1202 and 1204 is approximately 150 ppm. While at 1900 seconds, the difference between the curves 1202 and 1204 is decreased substantially to less than 50 ppm. As mentioned above, when the SCR outlet NOx sensor measures NOx data in a non-linear fashion (e.g., due to reductant deposits), as in FIG. 12, a non-linear relationship between the inlet and outlet NOx data may result. Therefore, conclusive results on the functionality of the inlet and outlet NOx sensors may be unable to be determined and additional purging of the deposits may need to be done.

Figure 11:
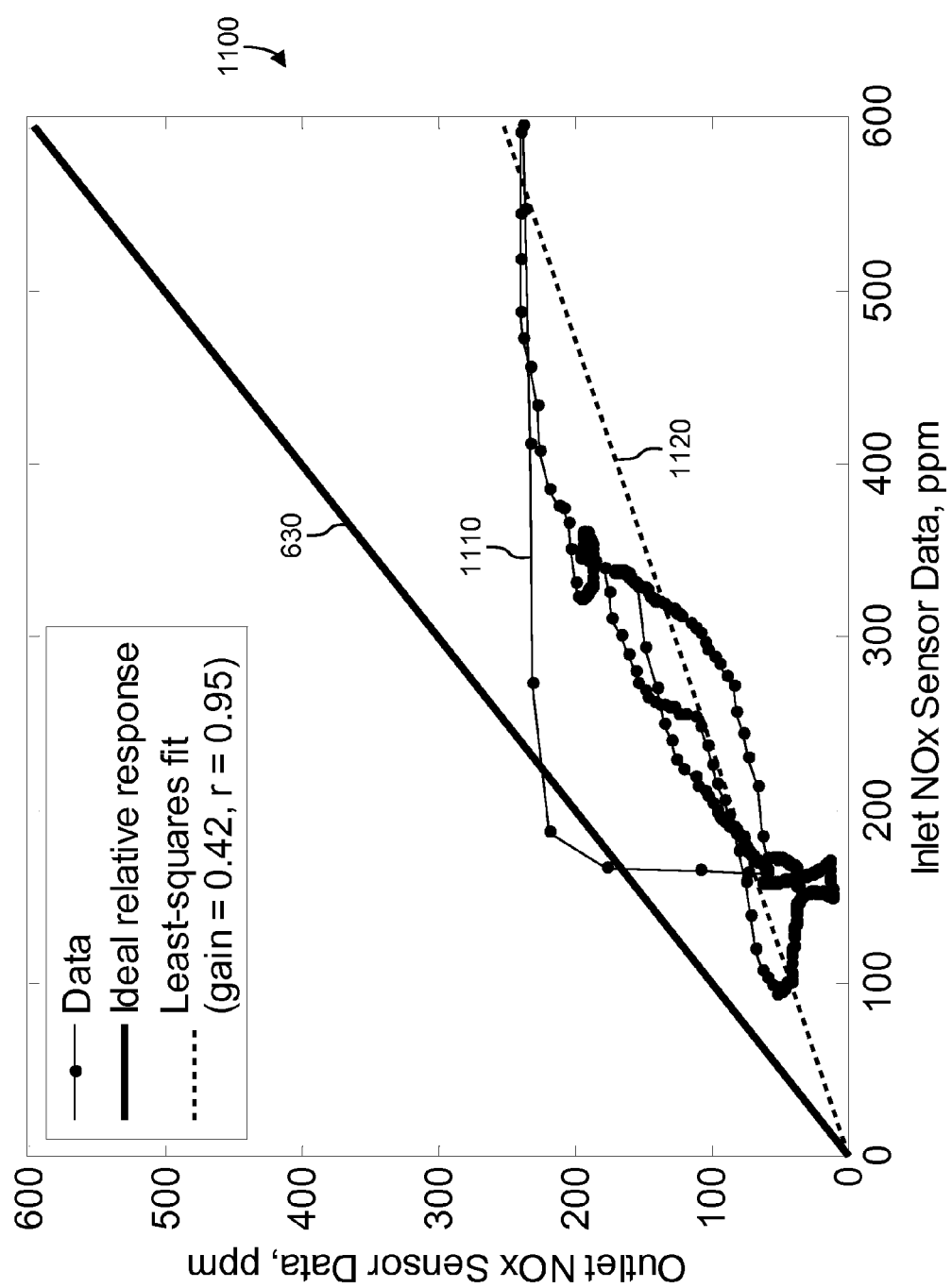
FIG. 11 is a graph of outlet NOx sensor data versus inlet NOx sensor data with reductant deposits present in the aftertreatment system between the inlet NOx and outlet NOx sensors, according to an example embodiment.

To further illustrate the inconclusive results state, FIG. 11 is now referenced. FIG. 11 depicts a graph of outlet NOx sensor data versus inlet NOx sensor data (e.g., the SCR inlet NOx data 112 and the SCR outlet NOx data 114, etc.) with reductant deposits present in the aftertreatment system between the NOx inlet and NOx outlet according to one embodiment. A graph 1100 includes the ideal response 630, diagnostic data 1110, and a least-squares linear regression line 1120. Fitting the least-squares linear regression line 1120 to the diagnostic data 1110 and applying equation [2] results in a gain of 0.42 and a correlation coefficient of 0.95. As a result, the system diagnostic module 109 determines the results to be inconclusive. According to one embodiment, system diagnostic module 109 provides a command to rerun the diagnostic procedure. If reductant is present in the SCR system, the SCR inlet and outlet NOx sensors 55 and 57 may not measure the same exhaust composition, resulting in data which is not approximately the same. The unsuccessful purging of the reductant deposits within the SCR system may lead to inconclusive results for the NOx sensor diagnostic test. Therefore, the remaining reductant may need to be purged, NOx data acquired again, a phase shift determined, and diagnostic features determined once again.

Referring back to FIG. 2, the system diagnostic module 109 may further determine that a faulty state exists with at least one of the SCR inlet and outlet NOx sensor. A faulty state may indicate that at least one of the SCR inlet and outlet NOx sensors 55 and 57 are operating incorrectly (e.g., detecting wrong amounts of NOx, be miscalibrated causing wrong amounts of NOx to be detected, etc.). This state may correspond with gain and correlation values outside of both the inconclusive ranges and the operational ranges. In one example, the system diagnostic module 109 is structured to determine that at least one of the SCR inlet NOx sensor and the SCR outlet NOx sensor are in a faulty state based on the correlation coefficient diagnostic feature being less than or equal to a correlation coefficient diagnostic feature threshold. According to one embodiment, the correlation coefficient diagnostic feature threshold zero. According to other embodiments, the correlation coefficient diagnostic feature threshold may be another value. The selection of this value may be configurable by the I/O device 120 and vary from application-to-application.

According to one embodiment, the faulty state may include, but is not limited to, three failure modes: an out-of-range error (high or low), an in-range error (high or low), and a stuck in-range error. According to one embodiment, the system diagnostic module 109 is structured to determine that at least one of the SCR inlet and outlet NOx sensors is faulty based on the correlation coefficient diagnostic feature being greater than or equal to an out-of-range correlation coefficient diagnostic feature threshold and the gain diagnostic feature being at least one of greater than or equal to a high out-of-range gain diagnostic feature parameter and within a set of low out-of-range gain diagnostic feature parameters. In one embodiment, the out-of-range error corresponds with the gain being at least one of greater than or equal to 3.0 (i.e., the high out-of-range gain diagnostic feature parameter) and less than or equal to 0.33 but greater than zero (i.e., the set of low out-of-range gain diagnostic feature parameters) and the correlation coefficient being greater than or equal to 0.98 (i.e., the out-of-range correlation coefficient diagnostic feature threshold).

According to one embodiment, the system diagnostic module 109 is structured to determine that at least one of the SCR inlet and outlet NOx sensors is faulty based on the correlation coefficient diagnostic feature being greater than or equal to an in-range correlation coefficient diagnostic feature threshold and the gain diagnostic feature being within at least one of a set of high in-range gain diagnostic feature parameters and a set of low in-range gain diagnostic feature parameters. In one embodiment, the in-range error corresponds with the gain being at least one of between 1.10 and 3 (i.e., the set of high in-range gain diagnostic feature parameters) and between 0.33 and 0.90 (i.e., the set of low in-range gain diagnostic feature parameters) and the correlation coefficient being greater than or equal to 0.98 (i.e., the in-range correlation coefficient diagnostic feature threshold). If a high in-range or high out-of-range error exists, at least one of the SCR outlet NOx sensor 57 and the SCR inlet NOx sensor 55 may be faulty. The SCR outlet NOx sensor 57 may be measuring high and the SCR inlet NOx sensor 55 may be measuring low amounts of NOx. If a low in-range or low out-of-range error exists, at least one of the SCR outlet NOx sensor 57 and the SCR inlet NOx sensor 55 may be faulty. The SCR outlet NOx sensor 57 may be measuring low and the SCR inlet NOx sensor 55 may be measuring high amounts of NOx. For example, as the NOx levels are excited, one sensor may be functioning properly and measuring the correct amounts of NOx in the exhaust. While the second sensor may have a calibration error or defect which causes it to measure NOx levels substantially higher or lower than the true amount.

According to one embodiment, the system diagnostic module 109 is structured to determine that at least one of the SCR inlet and outlet NOx sensors is faulty based on the correlation coefficient diagnostic feature being less than or equal to a stuck in-range correlation coefficient diagnostic feature threshold. In one embodiment, the stuck in-range failure mode corresponds with the correlation coefficient being less than zero or substantially zero (i.e., the stuck in-range correlation coefficient diagnostic feature threshold). For this failure mode, as the NOx levels are excited, one sensor may be functioning properly and measuring substantially correct amounts of NOx in the exhaust gas while the second sensor may have some sort of defect which causes it to measure NOx levels in the same range regardless of the excited levels of NOx in the exhaust as commanded by the engine module 105. For example, if the NOx amount is fluctuating between zero ppm and 2500 ppm, a sensor with a stuck in-range error may continually measure data in a range between 1200 and 1300 ppm. Therefore, a positive linear relationship may not exist between the inlet and outlet data causing the correlation coefficient diagnostic feature to be substantially zero or less than zero.

Figure 9:
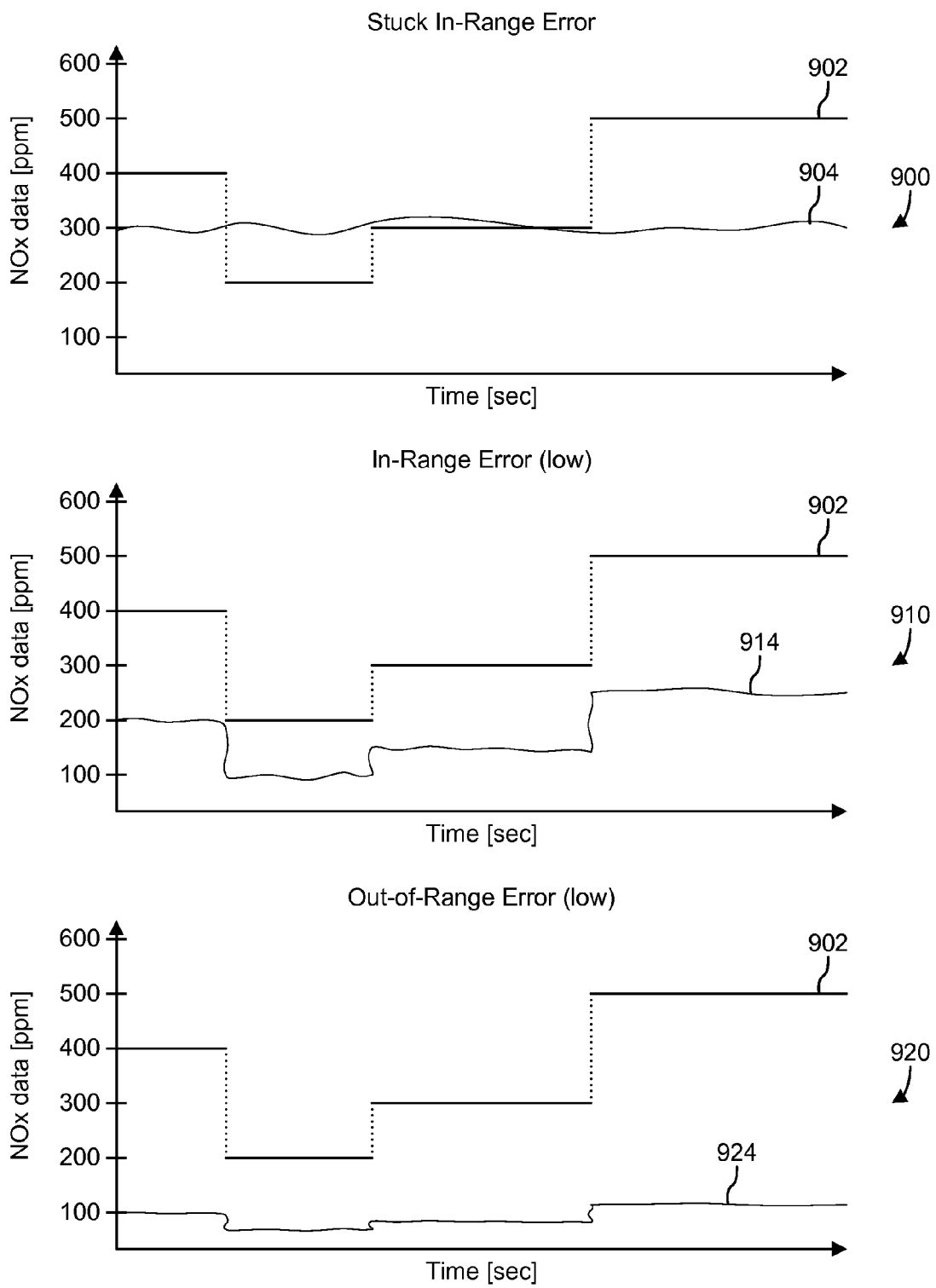
FIG. 9 are a series of graphs depicting various failure modes for SCR NOx inlet and NOx outlet sensors, according to an example embodiment.
Figure 10:
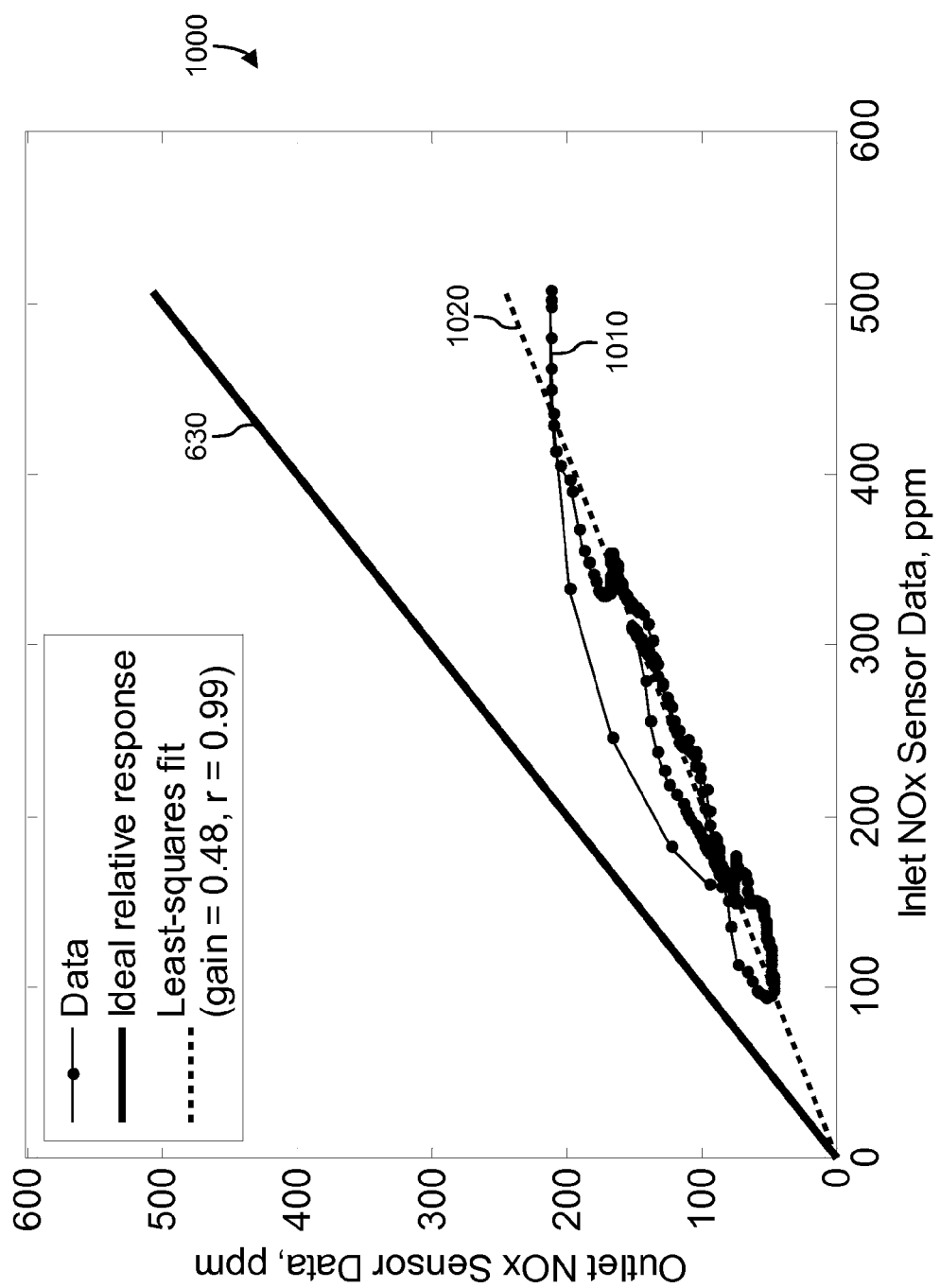
FIG. 10 is a graph of outlet NOx sensor data versus inlet NOx sensor data with a failed NOx outlet sensor, according to an example embodiment.

To further demonstrate the failure modes, FIGS. 9-10 are now referenced. FIG. 10 depicts a graph of outlet NOx sensor data versus inlet NOx sensor data (e.g., the SCR inlet NOx data 112 and the SCR outlet NOx data 114, etc.) for a failed NOx outlet sensor according to one embodiment. In this example, a graph 1000 includes the ideal response 630, diagnostic data 1010, and a least-squares linear regression line 1020. Fitting the least-squares linear regression line 1020 and applying equation [2] to the diagnostic data 1010 results in a gain of 0.48 and a correlation coefficient of 0.99. Therefore, based on the above defined failure modes, this failure is a low in-range error. The low in-range error may mean that the failure is in the SCR outlet NOx sensor 57, such that the outlet sensor is reading a lower than actual NOx amount (e.g., half). In other embodiments, the low in-range error may indicate failure for a SCR inlet NOx sensor 55, such that the inlet sensor is reading a higher than actual NOx amount (e.g., double). Therefore, since a failure of either the inlet or outlet NOx sensor may cause a fault code, it may not be possible to know which sensor is faulty and both sensors may need to be changed. In other embodiments, the gain and correlation coefficient may vary for this type of failure mode as long as each remains within the limits defined above.

Referring now to FIG. 9, a series of graphs depicting various failure modes for NOx inlet and outlet sensors are shown. A graph 900 shows a NOx data versus time relationship for a stuck in-range sensor failure. A reference signal 902 may be applied to a sensor with a stuck in-range error and a result like that of a sensor reading 904 may result. As shown, as the reference signal 902 fluctuates, the sensor reading 904 remains relatively constant. For example, during the excitation of the NOx levels via at least one of ignition timing and engine speed, one of the SCR NOx sensors may have a stuck in-range failure. Therefore, one sensor may read the correct NOx levels and the other may lack any response to the excitations and stay relatively constant. This type of response lacks any sort of correlation between the inlet and outlet data and may flag a fault code.

A graph 910 shows a NOx data versus time relationship for a low in-range sensor failure. The reference signal 902 may be applied to a sensor with a low in-range error and a result like that of a sensor reading 914 may result. As shown, as the reference signal 902 fluctuates, the sensor reading 914 fluctuates in the same manner, however at an amount half of the reference signal. A graph 920 shows substantially the same response as the graph 910 except it is a representation of a low out-of-range sensor failure. A sensor reading 924 fluctuates in the same manner as the sensor reading 914, however at an amount one-fourth of the reference signal. In either case, one of the sensors may be miscalibrated or faulty and the failed sensor may measure the changes in NOx levels, just at an incorrect proportion of the true amount.

Referring back to FIG. 2, based on the state determined by the system diagnostic module 109, the notification module 110 is structured to provide one or more notifications (e.g., fault codes). The notifications may correspond with a fault code, a notification (e.g., on the operator I/O device 120), and the like. The notification indicates the state of the SCR inlet and outlet NOx sensors 55 and 57. In the case of an operational state, the notification module 110 may supply a notification to the via the operator I/O device 120 to run diagnostic tests on other components of the exhaust aftertreatment system 22 that may cause a low SCR efficiency (e.g., the DEF dosing system, the DOC/DPF unit, and the SCR/AMOx catalyst unit) to determine the actual cause of the low SCR efficacy. Following an inconclusive results type of detection, the notification module 110 may notify the service technician to re-run the diagnostic testing due to reductant deposit detection. With any of the failure modes, the notification module 110 may supply a notification to the operator to replace the SCR NOx sensors due to faulty performance.

Figure 3:
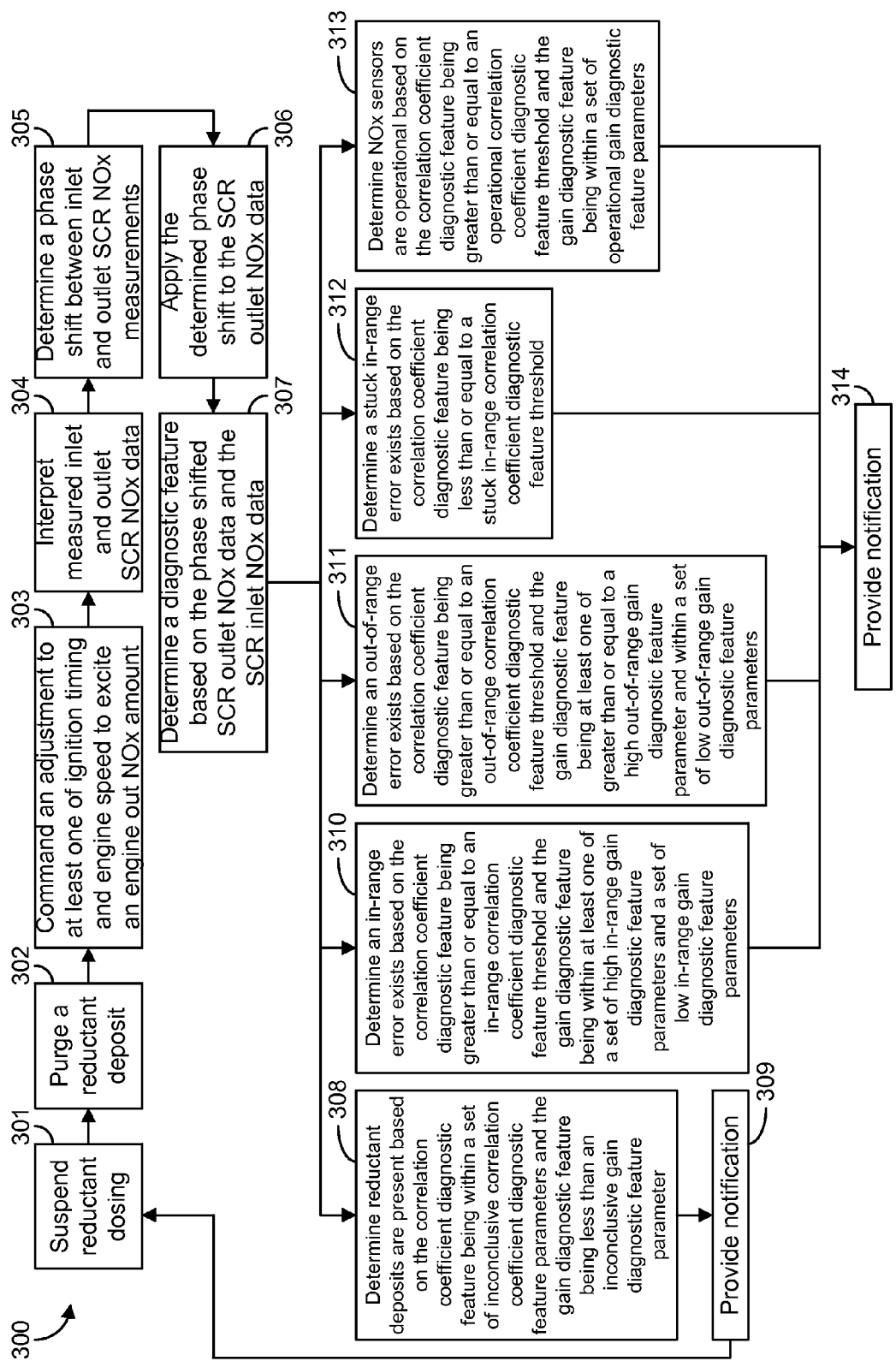
FIG. 3 is a flow diagram of a method of performing a NOx sensor diagnostic for an exhaust aftertreatment system, according to an example embodiment.

Referring now to FIG. 3, a method 300 of performing NOx sensor rationality diagnostics for an exhaust aftertreatment system according to an example embodiment. In one example embodiment, method 300 may be implemented with the controller 100 of FIG. 1. Accordingly, method 300 may be described in regard to FIGS. 1-2.

At process 301, the controller 100 provides a dosing command to suspend reductant dosing in the exhaust aftertreatment system 22. According to one embodiment, in order to perform a NOx sensor rationality diagnostic across the SCR system, the reductant needs to be suspended so that the inlet and outlet NOx levels are substantially equivalent during the time of the diagnostic testing. For example, if the reductant dosing is not suspended, the ammonia in the reductant may react with NOx in the presence of the SCR catalyst 50 and reduce the NOx to less harmful emissions, such as $N_2$ and $H_2O$. In this case, it may not be possible to deduce a credible state of the SCR inlet and outlet NOx sensors 55 and 57 since they may be measuring different exhaust compositions. Measuring different exhaust compositions declines the ability to perform a rational diagnostic test of the inlet and outlet NOx sensors.

At process 302, the controller 100 provides a command to purge the reductant deposits within the SCR system. The purging of the reductant deposits may be done either mechanically or by decomposing the reductant deposits via an increase in temperature (i.e., thermally). Mechanical purging may include a technician physically removing all or substantially all the reductant deposits in the SCR system. Thermal purging may include providing one or more commands to the engine system to increase the exhaust gas temperatures. This causes the exhaust gas temperatures to be relatively warmer while flowing through the SCR system. In turn, the relatively warmer exhaust gas temperatures may burn off or purge the reductant deposits in the SCR system. The commands may include, but are not limited to, increasing engine speed, advancing ignition timing, a post-combustion fuel injection, and any other command that increases the exhaust gas temperature.

At process 303, the controller 100 provides a command to adjust an engine out NOx amount. By affecting the engine out NOx amount, the amount of NOx measured by the NOx sensors may also change. According to one embodiment, the command may include, but is not limited to, an adjustment to ignition timing, an adjustment to engine speed, and any other command that affects or adjusts an engine out NOx amount. As mentioned above, the ignition timing may be at least one of advanced and retarded and the engine speed may be at least one of increased and decreased. Any of these changes may cause an adjustment to the NOx levels in the exhaust flow. For example, increases in NOx levels may be caused by at least one of advancing ignition timing and increasing engine speed. While decreases in NOx levels may be caused by at least one of retarding ignition timing and reducing engine speed. The excitation of NOx levels may only last seconds (e.g., 30 to 60 seconds) in some embodiments, while in other embodiments it may last minutes (e.g., 1 to 5 minutes or longer). During the excitation process, the SCR inlet and outlet NOx sensors 55 and 57 may measure the changes in the NOx levels.

At process 304, the controller 100 interprets the measured SCR inlet and outlet NOx data (e.g., the SCR inlet NOx data 112 and the SCR outlet NOx data 114, etc.) from the SCR inlet and outlet NOx sensors. This data may be stored in the SCR inlet and outlet NOx modules 106 and 107 to be utilized by the phase correction module 108. At process 305, the controller 100 determines a phase shift between the inlet and outlet measured NOx data. The phase shift represents a duration for an amount of exhaust gas to travel from the SCR inlet NOx sensor to the SCR outlet NOx sensor. For example, as the NOx levels are excited, the inlet and outlet SCR NOx sensors may record data out-of-phase due to the transport delay of the exhaust traveling from the inlet to the outlet of the SCR system. To account for this phase shift (i.e., time shift), a statistical function (e.g., cross-correlation function, cross-covariance function, etc.) may be applied to determine the phase shift. The determined phase shift is applied to the SCR outlet NOx data at process 306.

At process 307, the controller 100 determines a diagnostic feature based on the SCR inlet NOx data and phase shifted SCR outlet NOx data. The diagnostic feature provides an indication of a state regarding the SCR inlet and outlet NOx sensors 55 and 57. As mentioned above, the state of the SCR inlet and outlet NOx sensors may include operational, inconclusive results, or faulty. As also mentioned above, the diagnostic feature may include at least one of a gain diagnostic feature and a correlation coefficient diagnostic feature. Example process determinations regarding the state of at least one of the SCR inlet and outlet NOx sensors are shown in processes 308 and 310-313.

At process 308, the controller 100 determines reductant deposits are present in the SCR system 52 based on the gain diagnostic feature being less than the inconclusive gain diagnostic feature parameter (e.g., 0.90) and the correlation coefficient being within the set of inconclusive correlation coefficient diagnostic feature parameters (e.g., 0 to 0.98). If this state is detected, a notification (process 309) may appear in front of the operator or service technician via the operator I/O device 120. This particular notification instructs the technician to re-run the diagnostic test (processes 301-307) due to reductant deposit detection.

Processes 310-313 determine the state of the SCR NOx sensors (e.g., faulty such as having an out-of-range error (high or low), an in-range error (high or low), and a stuck in-range error, or operational) based on the above defined gain and correlation coefficient for the failure modes and operational state. For processes 310-312, each process determines that at least one of the SCR inlet NOx sensor and the SCR outlet NOx sensor are faulty. At process 310, the controller 100 determines a SCR NOx sensor in-range error exists based on the correlation coefficient being greater than or equal to an in-range correlation coefficient diagnostic feature threshold (e.g., 0.98) and the gain diagnostic feature being within the set of in-range gain diagnostic feature parameters (e.g., 0.33 to 0.90 or 1.10 to 3.0). At process 311, the controller 100 determines a SCR NOx sensor out-of-range error exists based on the correlation coefficient being greater than or equal to the out-of-range correlation coefficient diagnostic feature threshold (e.g., 0.98) and the gain being either greater than or equal to the high out-of-range gain diagnostic feature parameter (e.g., 3.00) or within the set of low out-of-range gain diagnostic feature parameters (e.g., 0 to 0.33). At process 312, the controller 100 determines a SCR NOx sensor stuck in-range error exists based on the determined correlation diagnostic feature being less than or equal to the stuck in-range correlation coefficient diagnostic feature threshold (e.g., zero). Therefore, for processes 310-312, the controller 100 may supply a notification to a technician via the operator I/O device 120 to replace the SCR inlet and outlet NOx sensors 55 and 57 (process 314). However, for process 313, the controller 100 determines the SCR inlet and outlet NOx sensors are operational based on the correlation coefficient diagnostic feature being greater than or equal to the operational correlation coefficient diagnostic feature threshold (e.g., 0.98) and the gain diagnostic feature being within the set of operational gain diagnostic feature parameters (e.g., 0.90 to 1.10). Therefore, the controller 100 may supply a notification to the user via the operator I/O device 120 to run various diagnostic tests on other components of the exhaust aftertreatment system 22 (process 314), as mentioned above.

An example implementation of the method 300 is as follows. In this example, the aftertreatment system is embodied in a vehicle and a low SCR efficiency has been received by the operator of the vehicle. To clear the fault code, the operator of the vehicle brings the vehicle to a service test center. A technician, via the controller, begins to purge the reductant deposits in the SCR system (processes 301-302). The controller then adjusts the engine out NOx amount while the SCR inlet and outlet sensors are measuring the NOx amounts flowing through the SCR system (processes 303-304). After a predetermined amount of time, the controller beings the next part of the diagnostic procedure. Here, the controller uses the measured SCR inlet and outlet NOx data (e.g., the SCR inlet NOx data 112 and the SCR outlet NOx data 114, etc.) to determine a phase shift for the SCR outlet NOx data (process 305) and applies the determined phase shift to the SCR outlet NOx data (process 306). In this example, the controller plots the SCR inlet NOx data versus the phase shifted SCR outlet NOx data. Using this plot, the controller, determines one or more diagnostic features regarding a state of the SCR inlet and outlet NOx sensors (process 307). For example, the controller may determine that SCR inlet and outlet NOx sensors are operational based on the correlation coefficient diagnostic feature being greater than or equal to the operational correlation coefficient diagnostic feature threshold (e.g., 0.98) and the gain diagnostic feature being within the set of operational gain diagnostic feature parameters (e.g., 0.90 to 1.10). In which case, the technician may eliminate the NOx sensors from the troubleshooting process and move onto a next component to troubleshoot. In another example, the controller may determine that at least one of the SCR inlet and outlet NOx sensors are faulty (e.g., an in-range failure mode as described above). The controller provides a notification to the technician (e.g., process 309). The technician may examine both sensors (e.g., their connections) and possibly replace one of the sensors. The technician may re-run the diagnostic. If the same or another failure mode regarding the SCR NOx sensors is determined by the controller, the technician may replace the other SCR NOx sensor. At this point, the technician may re-run the diagnostic to determine if the failure code is cleared. If not, the technician may troubleshoot other components of the aftertreatment system and/or determine that the new replaced NOx sensors have a defect.

In any event, method 300 provides an intrusive diagnostic method that enables a technician to isolate low SCR efficiency failure codes to the SCR inlet and outlet NOx sensors. In some instances, this isolation may send the user time and money by foregoing the need to perform time-consuming and costly diagnostic procedures.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a dosing module structured to suspend dosing in an exhaust aftertreatment system; an engine module structured to provide a command to an engine to affect an engine out nitrogen oxide (NOx) amount;
a selective catalytic reduction (SCR) inlet NOx module structured to interpret a measured SCR inlet NOx data from a SCR inlet NOx sensor;
a SCR outlet NOx module structured to interpret a measured SCR outlet NOx data from a SCR outlet NOx sensor;
a phase correction module structured to determine a phase shift between the measured SCR inlet NOx data and the measured SCR outlet NOx data and apply the phase shift to the measured SCR outlet NOx amount data; and
a system diagnostic module structured to determine a diagnostic feature based on the SCR inlet NOx data and the phase shifted SCR outlet NOx data, wherein the system diagnostic module is structured to determine a state of the SCR inlet and outlet NOx sensors based on the diagnostic feature, and notify a user of the state of the SCR inlet and outlet NOx sensors, the state including at least one of an operational state and that at least one of the SCR inlet and outlet NOx sensors are faulty.

2. The apparatus of claim 1,
wherein the diagnostic feature includes a first diagnostic feature and a second diagnostic feature;
wherein the first diagnostic feature is a gain diagnostic feature, the gain diagnostic feature representing a slope of a best fit line for the phase shifted SCR outlet NOx data and the SCR inlet NOx data; and
wherein second diagnostic feature is a correlation coefficient diagnostic feature that provides an indication of a linear relationship for the SCR inlet NOx data and the phase shifted SCR outlet NOx data.

3. The apparatus of claim 2, wherein the system diagnostic module is structured to determine that at least one of the SCR inlet NOx sensor and the SCR outlet NOx sensor are in a faulty state based on the correlation coefficient diagnostic feature being less than or equal to a stuck in-range correlation coefficient diagnostic feature threshold.

4. The apparatus of claim 3, wherein the correlation coefficient diagnostic threshold is zero.

5. The apparatus of claim 2, wherein the system diagnostic module is structured to determine that a faulty state exists with at least one of the SCR inlet and outlet NOx sensors based on the gain diagnostic feature being within a set of high in-range gain diagnostic feature parameters and the correlation diagnostic feature being greater than or equal to an in-range correlation coefficient diagnostic feature threshold.

6. The apparatus of claim 2, wherein the system diagnostic module is structured to determine that a faulty state exists with at least one of the SCR inlet and outlet NOx sensors based on the gain diagnostic feature being at least one of greater than or equal to a high out-of-range gain diagnostic feature parameter and within a set of low out-of-range gain diagnostic feature parameters and the correlation diagnostic feature being greater than or equal to an out-of-range correlation coefficient diagnostic feature threshold.

7. The apparatus of claim 2, wherein the system diagnostic module is structured to determine that a faulty state exists with at least one of the SCR inlet and outlet NOx sensors based on the gain diagnostic feature falling within a set of low in-range gain diagnostic feature parameters and the correlation diagnostic feature being greater than or equal to an in-range correlation coefficient diagnostic feature threshold.

8. The apparatus of claim 2, wherein the system diagnostic module is structured to determine that the SCR inlet and outlet NOx sensors are in the operational state based on the correlation coefficient diagnostic feature being greater than or equal to an operational correlation coefficient diagnostic feature threshold and the gain diagnostic feature being within a set of operational gain diagnostic feature parameters.

9. The apparatus of claim 8, wherein the operational correlation coefficient diagnostic feature threshold is 0.98 and the set of operational gain diagnostic feature parameters is 0.90 to 1.10.

10. A system, comprising: an engine;
an exhaust aftertreatment system in exhaust gas receiving communication with the engine, wherein the exhaust aftertreatment system includes having a selective catalytic reduction (SCR) system; and
a controller communicably coupled to the engine and the exhaust aftertreatment system, the controller configured to:
adjust a nitrogen oxide (NOx) amount out of the engine that is then received by the SCR system;
interpret a measured SCR inlet NOx data from a SCR inlet NOx sensor and a measured SCR outlet NOx data from a SCR outlet NOx sensor;
determine a phase shift between the measured SCR inlet and SCR outlet NOx data;
apply the determined phase shift to the SCR outlet NOx data; and
determine a diagnostic feature based on the SCR inlet NOx data and the phase shifted SCR outlet NOx data regarding a state of the SCR inlet and outlet NOx sensors, and notify a user of the state of the SCR inlet and outlet NOx sensors, the state including at least one of an operational state and that at least one of the SCR inlet and outlet NOx sensors are faulty.

11. The system of claim 10, wherein the phase shift represents a duration for an amount of exhaust gas to travel from the SCR inlet NOx sensor to the SCR outlet NOx sensor.

12. The system of claim 10, wherein the diagnostic feature includes a first diagnostic feature and a second diagnostic feature, wherein the first diagnostic feature is a gain diagnostic feature and the second diagnostic feature is a correlation coefficient diagnostic feature.

13. The system of claim 12, wherein the gain diagnostic feature includes a slope of a best fit line for the phase shifted SCR outlet NOx data and the SCR inlet NOx data.

14. The system of claim 13, wherein the correlation coefficient diagnostic feature provides an indication of a linear relationship for the SCR inlet NOx data and the phase shifted SCR outlet NOx data.

15. The system of claim 14, wherein the system diagnostic module is structured to determine that the SCR inlet and outlet NOx sensors are in an operational state based on the gain diagnostic feature being within a set of operational gain diagnostic feature parameters and the correlation diagnostic feature being greater than or equal to an operational correlation coefficient diagnostic feature threshold.

* * * * *